US012615577B2

(12) United States Patent
Takahashi et al.

(10) Patent No.: US 12,615,577 B2
(45) Date of Patent: Apr. 28, 2026

(54) TERMINAL APPARATUS, BASE STATION APPARATUS, AND COMMUNICATION METHOD

(71) Applicant: Sharp Kabushiki Kaisha, Sakai City (JP)

(72) Inventors: Hiroki Takahashi, Sakai City (JP); Shohei Yamada, Sakai City (JP); Liqing Liu, Sakai City (JP); Meng Cheng, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 297 days.

(21) Appl. No.: 18/289,583

(22) PCT Filed: Mar. 23, 2022

(86) PCT No.: PCT/JP2022/013488
§ 371 (c)(1),
(2) Date: Nov. 6, 2023

(87) PCT Pub. No.: WO2022/239492
PCT Pub. Date: Nov. 17, 2022

(65) Prior Publication Data
US 2024/0251334 A1      Jul. 25, 2024

(30) Foreign Application Priority Data

May 10, 2021      (JP) .................................. 2021-079578

(51) Int. Cl.
*H04W 48/12*          (2009.01)
(52) U.S. Cl.
CPC .................................. *H04W 48/12* (2013.01)

(58) Field of Classification Search
CPC ......... H04W 48/12; H04L 12/50; H04L 12/28
USPC ................................. 370/329, 401, 402, 403
See application file for complete search history.

(56) References Cited

U.S. PATENT DOCUMENTS

| | | | |
|---|---|---|---|
| 2023/0179386 A1* | 6/2023 | Liu ........................ | H04L 5/0048 370/252 |
| 2023/0224865 A1* | 7/2023 | Liu ........................ | H04L 5/0053 370/329 |
| 2024/0172236 A1* | 5/2024 | Maemoto .............. | H04L 1/1812 |

OTHER PUBLICATIONS

Official Communication issued in International Patent Application No. PCT/JP2022/013488, mailed on Jun. 21, 2022.

(Continued)

*Primary Examiner* — Dang T Ton
(74) *Attorney, Agent, or Firm* — Keating & Bennett, LLP

(57) ABSTRACT
A terminal apparatus receives first information including second information indicating a parameter for an initial DL BWP and third information indicating a parameter for a PDCCH, the second information including fourth information indicating a first frequency location and bandwidth of the initial DL BWP and fifth information indicating a subcarrier spacing, the frequency location and bandwidth of the initial DL BWP is indicated by sixth information indicating a second frequency location and bandwidth of the initial DL BWP in a case that the first information includes the sixth information, and is indicated by the fourth information in a case that the first information does not include the sixth information, and the PDCCH is monitored based on the third information regardless of whether the first information includes the sixth information or not.

3 Claims, 13 Drawing Sheets

(56) References Cited

OTHER PUBLICATIONS

NTT Docomo, "Revision of SI: Study on New Radio Access Technology", 3GPP TSG RAN Meeting #72, RP-161214, Jun. 13-16, 2016, 8 pages.

Ericsson, "New SID on support of reduced capability NR devices", 3GPP TSG RAN Meeting #86, RP-193238, Dec. 9-12, 2019, 5 pages.

"3rd Generation Partnership Project; Technical Specification Group Radio Access Network; NR; Radio Resource Control (RRC) protocol specification (Release 16)", 3GPP TS 38.331 V16.4.1, Mar. 2021, pp. 1-949.

* cited by examiner

| Channel or signal | OFDM symbol number $l$ relative to the start of an SS/PBCH block | Subcarrier number $k$ relative to the start of an SS/PBCH block |
|---|---|---|
| PSS | 0 | 56 - 182 |
| SSS | 2 | 56 - 182 |
| set to 0 | 0 | 0 - 55, 183 - 239 |
| | 2 | 48 - 55, 183 - 191 |
| PBCH | 1, 3 | 0 - 239 |
| | 2 | 0 - 47, 192 - 239 |
| DMRS for PBCH | 1, 3 | $0+v, 4+v, ..., 236+v$ |
| | 2 | $0+v, 4+v, ..., 44+v$ $192+v, 196+v, ..., 236+v$ |

FIG. 5 frequency

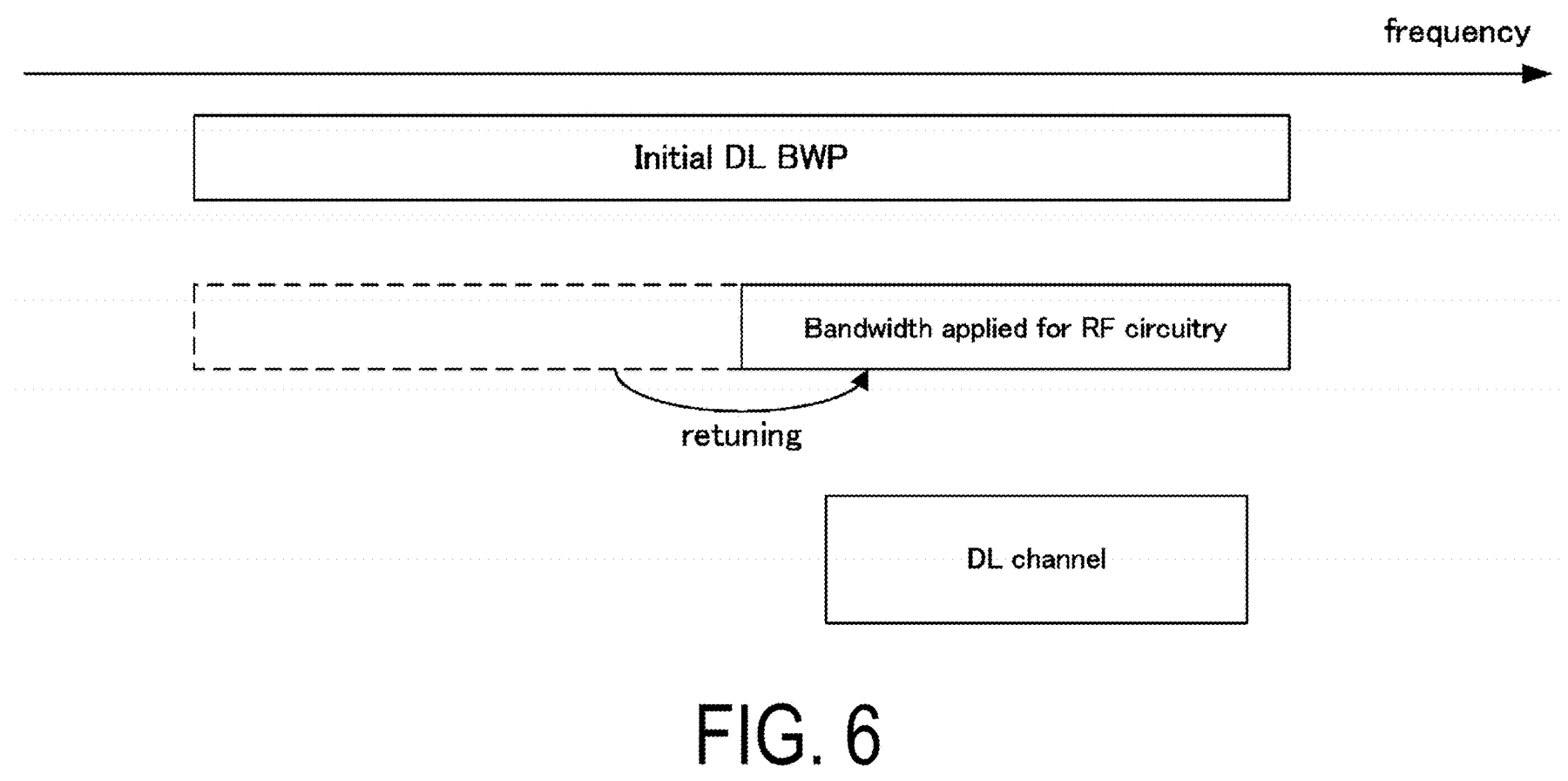

Initial DL BWP

Bandwidth applied for RF circuitry retuning

DL channel

FIG. 6

```
initialDownlinkBWP     BWP-DownlinkCommon

BWP-DownlinkCommon ::=     SEQUENCE {
    genericParameters          BWP,
    pdcch-ConfigCommon         SetupRelease { PDCCH-ConfigCommon }
    pdsch-ConfigCommon         SetupRelease { PDSCH-ConfigCommon }
    locationAndBandwidth-rc    INTEGER (0..37949)

...
}

BWP ::=     SEQUENCE {
    locationAndBandwidth    INTEGER (0..37949),
    subcarrierSpacing       SubcarrierSpacing,
    cyclicPrefix            ENUMERATED { extended }

```
initialUplinkBWP        BWP-UplinkCommon

BWP-UplinkCommon ::=     SEQUENCE {
    genericParameters       BWP,
    rach-ConfigCommon       SetupRelease { RACH-ConfigCommon },
    pusch-ConfigCommon      SetupRelease { PUSCH-ConfigCommon },
    pucch-ConfigCommon      SetupRelease { PUCCH-ConfigCommon },
    locationAndBandwidth-rc INTEGER (0..37949),
    ...,
}

BWP ::=                  SEQUENCE {
    locationAndBandwidth    INTEGER (0..37949),
    subcarrierSpacing       SubcarrierSpacing,
    cyclicPrefix            ENUMERATED { extended }
}
```

FIG. 9

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2021-79578 filed on May 10, 2021, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by The Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT). Furthermore, in Release 17, which is a future release of NR, a reduced capability (REDCAP) NR device that does not require high requirements unlike eMBB and URLLC and achieves cost reduction and long battery life is being studied on the assumption of applications such as sensor networks, monitoring cameras, and/or wearable devices (NPL 2).

CITATION LIST

Non Patent Literature

NPL 1: RP-161214, NTT DOCOMO, "Revision of SI: Study on New Radio Access Technology", June 2016
NPL 2: RP-193238, Ericsson, "New SID on support of reduced capability NR devices", December 2019

SUMMARY OF INVENTION

Technical Problem

An object of the present invention is to provide a terminal apparatus, a base station apparatus, and a communication method that enable efficient communication in a radio communication system as that described above.

Solution to Problem (1) In order to accomplish the object described above, an aspect of the present invention is contrived to provide the following means. Specifically, a terminal apparatus according to an aspect of the present invention includes a receiver configured to receive first information, and a monitor unit configured to monitor a physical downlink control channel in an initial downlink BWP, wherein the first information indicates common parameters for an initial downlink BWP of a cell, and includes second information indicating generic parameters for the initial downlink BWP and third information indicating cell common parameters for the physical downlink control channel in the initial downlink BWP, the second information includes fourth information indicating a first frequency location and bandwidth of the initial downlink BWP and fifth information indicating a subcarrier spacing of a channel used in the initial downlink BWP, a frequency location and bandwidth of the initial downlink BWP is indicated in sixth information indicating a second frequency location and bandwidth of the initial downlink BWP in a case that the first information includes the sixth information, the frequency location and bandwidth of the initial downlink BWP is indicated in the fourth information in a case that the first information does not include the sixth information, and the monitor unit monitors the physical downlink control channel, based on the third information regardless of whether or not the first information includes the sixth information.

(2) A base station apparatus according to an aspect of the present invention includes a broadcast unit configured to broadcast first information, and a transmitter configured to transmit a first physical downlink control channel to a first terminal apparatus and transmit a second physical downlink control channel to a second terminal apparatus, wherein the first information indicates common parameters for an initial downlink BWP of a cell, and includes second information indicating generic parameters for the initial downlink BWP and third information indicating cell common parameters for a physical downlink control channel in the initial downlink BWP, the second information includes fourth information indicating a first frequency location and bandwidth of the initial downlink BWP and fifth information indicating a subcarrier spacing of a channel used in the initial downlink BWP, the first information includes sixth information indicating a second frequency location and bandwidth of the initial downlink BWP, a frequency location and bandwidth of the initial downlink BWP for the first terminal apparatus is indicated in the sixth information, a frequency location and bandwidth of the initial downlink BWP for the second terminal apparatus is indicated in the fourth information, and the transmitter transmits the first physical downlink control channel and the second physical downlink control channel, based on the third information.

(3) A communication method according to an aspect of the present invention is a communication method for a terminal apparatus, the method including receiving first information, and monitoring a physical downlink control channel in an initial downlink BWP, wherein the first information indicates common parameters for an initial downlink BWP of a cell, and includes second information indicating generic parameters for the initial downlink BWP and third information indicating cell common parameters for the physical downlink control channel in the initial downlink BWP, the second information includes fourth information indicating a first frequency location and bandwidth of the initial downlink BWP and fifth information indicating a subcarrier spacing of a channel used in the initial downlink BWP, a frequency location and bandwidth of the initial downlink BWP is indicated in sixth information indicating a second frequency location and bandwidth of the initial downlink BWP in a case that the first information includes the sixth information, the frequency location and bandwidth of the initial downlink BWP is indicated in the fourth information in a case that the first information does not include the sixth information, and the physical downlink control channel is monitored based on the third information regardless of whether or not the first information includes the sixth information.

(4) A communication method according to an aspect of the present invention is a communication method for a base station apparatus, the method including broadcasting first information, transmitting a first physical downlink control channel to a first terminal apparatus, and transmitting a second physical downlink control channel to a second terminal apparatus, wherein the first information indicates common parameters for an initial downlink BWP of a cell, and includes second information indicating generic parameters for the initial downlink BWP and third information indicating cell common parameters for a physical downlink control channel in the initial downlink BWP, the second information includes fourth information indicating a first frequency location and bandwidth of the initial downlink BWP and fifth information indicating a subcarrier spacing of a channel used in the initial downlink BWP, the first information includes sixth information indicating a second frequency location and bandwidth of the initial downlink BWP, a frequency location and bandwidth of the initial downlink BWP for the first terminal apparatus is indicated in the sixth information, a frequency location and bandwidth of the initial downlink BWP for the second terminal apparatus is indicated in the fourth information, and the first physical downlink control channel and the second physical downlink control channel are transmitted based on the third information.

Advantageous Effects of Invention

According to one aspect of the present invention, a terminal apparatus and a base station apparatus can efficiently communicate with each other.

BRIEF DESCRIPTION OF DRAWINGS

FIG. 5 is a diagram illustrating resources in which a PSS, an SSS, a PBCH, and a DMRS for the PBCH are mapped in the SS/PBCH block according to an embodiment of the present invention.

FIG. 6 is a diagram illustrating an example of RF retuning according to an embodiment of the present invention.

FIG. 7 is a diagram illustrating an example of a parameter configuration of an information element (IE) BWP-DownlinkCommon of initialDownlinkBWP according to an embodiment of the present invention.

FIG. 9 is a diagram illustrating an example of a parameter configuration of an information element (IE) BWP-UplinkCommon of initialUplinkBWP according to an embodiment of the present invention.

DESCRIPTION OF EMBODIMENTS

An embodiment of the present invention will be described below.

Figure 1:
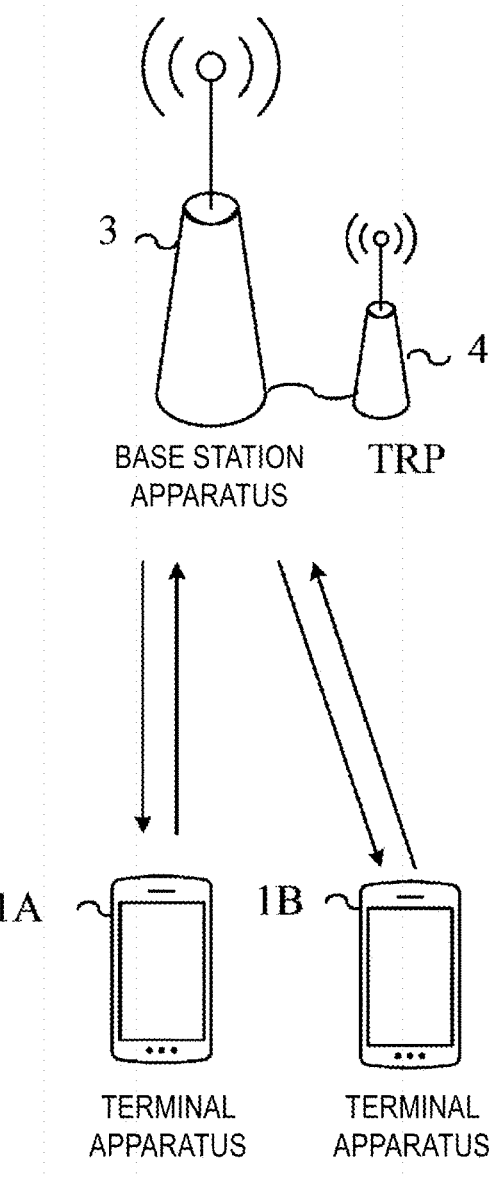
FIG. 1 is a diagram illustrating a concept of a radio communication system according to an embodiment of the present invention.

FIG. 1 is a conceptual diagram of a radio communication system according to the present embodiment. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1 below.

The terminal apparatus 1 is also called a user terminal, a mobile station device, a communication terminal, a mobile device, a terminal, User Equipment (UE), and a Mobile Station (MS). However, the terminal apparatus 1 may be a REDCAP NR device and may be referred to as a REDCAP UE. The base station apparatus 3 is also referred to as a radio base station apparatus, a base station, a radio base station, a fixed station, a Node B (NB), an evolved Node B (eNB), a Base Transceiver Station (BTS), a Base Station (BS), an NR Node B (NR NB), NNB, a Transmission and Reception Point (TRP), or gNB. The base station apparatus 3 may include a core network apparatus. Furthermore, the base station apparatus 3 may include one or multiple transmission reception points 4. At least some of the functions/processing of the base station apparatus 3 described below may be the functions/processing of each of the transmission reception points 4 included in the base station apparatus 3. The base station apparatus 3 may use a communicable range (communication area) controlled by the base station apparatus 3, as one or multiple cells to serve the terminal apparatus 1. Furthermore, the base station apparatus 3 may use a communicable range (communication area) controlled by one or multiple transmission reception points 4, as one or multiple cells to serve the terminal apparatus 1. Additionally, the base station apparatus 3 may divide one cell into multiple Beamed areas and serve the terminal apparatus 1 in each of the beamed areas. Here, a beamed area may be identified based on a beam index used for beamforming or a precoding index.

In the present embodiment, a radio communication link from the base station apparatus 3 to the terminal apparatus 1 is referred to as a downlink. In the present embodiment, a radio communication link from the terminal apparatus 1 to the base station apparatus 3 is referred to as an uplink.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

Furthermore, in FIG. 1, in the radio communication between the terminal apparatus 1 and the base station apparatus 3, the CP need not be used, or the above-described transmission scheme with zero padding may be used instead of the CP. Moreover, the CP or zero padding may be added both forward and backward.

An aspect of the present embodiment may be operated in carrier aggregation or dual connectivity with the RadioAccess Technologies (RAT) such as LTE and LTE-A/LTE-A Pro. In this case, an aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, an aspect of the present embodiment may be independently operated and used in a stand-alone manner. In the dual connectivity operation, the Special Cell (SpCell) is referred to as a PCell of the MCG or a PSCell of the SCG, respectively, depending on whether a Medium Access Control (MAC) entity is associated with the MCG or the SCG. In a case that the operation is not in dual connectivity, the Special Cell (SpCell) is referred to as a PCell. The Special Cell (SpCell) supports PUCCH transmission and contention based random access.

In the present embodiment, one or multiple serving cells may be configured for the terminal apparatus 1. The multiple serving cells configured may include one primary cell and one or multiple secondary cells. The primary cell may be a serving cell on which an initial connection establishment procedure has been performed, a serving cell in which a connection reestablishment procedure has been initiated, or a cell indicated as a primary cell in a handover procedure. One or multiple secondary cells may be configured at a point of time in a case that or after a Radio Resource Control (RRC) connection is established. Note that the multiple serving cells configured may include one primary secondary cell. The primary secondary cell may be a secondary cell that is included in the one or multiple secondary cells configured and in which the terminal apparatus 1 can transmit control information in the uplink. Additionally, subsets of two types of serving cells corresponding to a master cell group and a secondary cell group may be configured for the terminal apparatus 1. The master cell group may include one primary cell and zero or more secondary cells. The secondary cell group may include one primary secondary cell and zero or more secondary cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated. The TDD scheme may be referred to as an Unpaired spectrum operation. The FDD scheme may be referred to as a Paired spectrum operation.

The subframe will now be described. In the present embodiment, the following is referred to as the subframe, and the subframe in the present embodiment may also be referred to as a resource unit, a radio frame, a time period, or a time interval.

Figure 2:
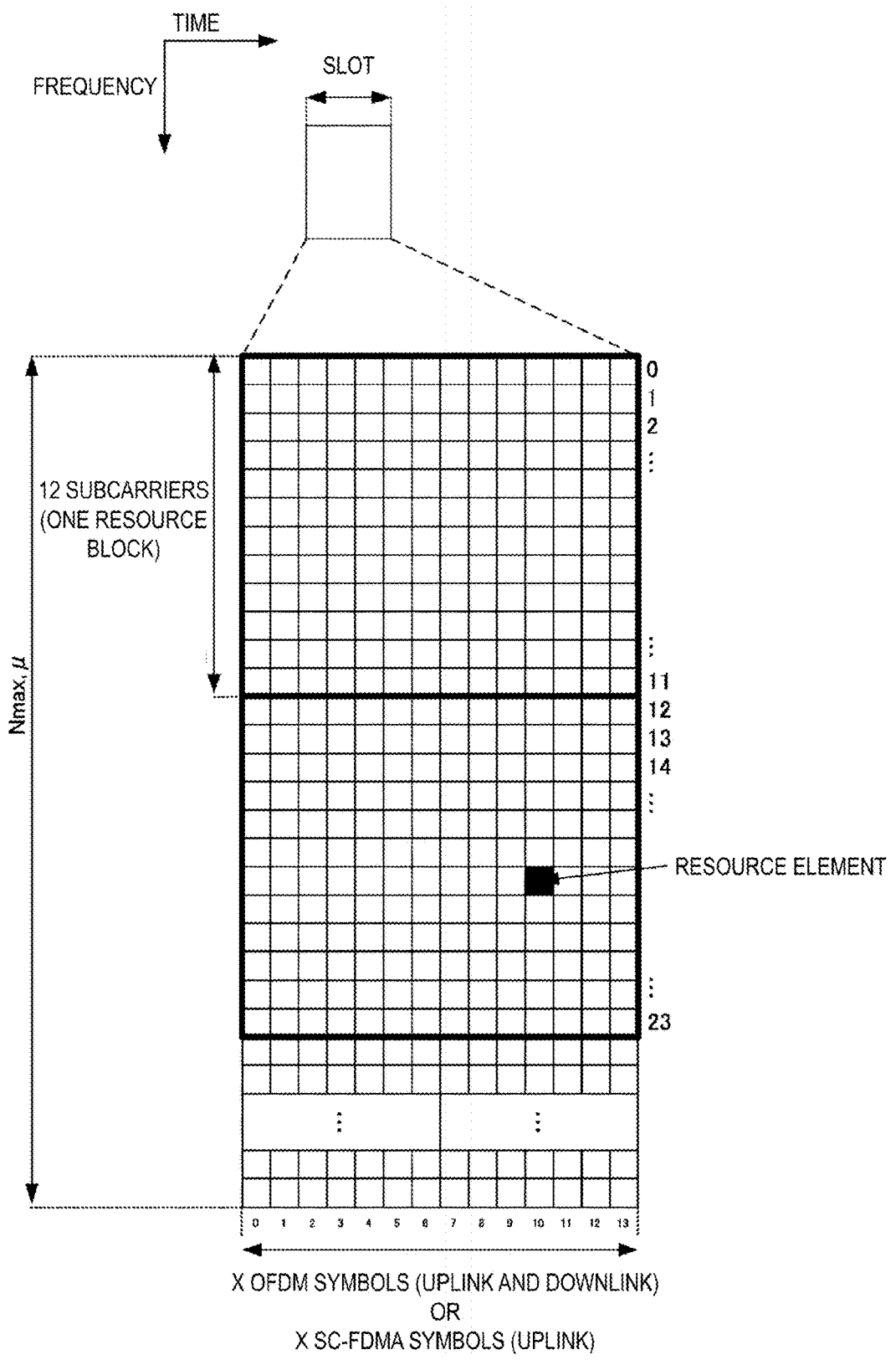
FIG. 2 is a diagram illustrating a schematic configuration of an uplink slot and a downlink slot according to an embodiment of the present invention.

FIG. 2 is a diagram illustrating a schematic configuration of an uplink slot and a downlink slot according to a first embodiment of the present invention. Each of the radio frames is 10 ms in length. Additionally, each of the radio frames includes 10 subframes and W slots. In addition, one slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 and X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. Additionally, for example, for X=14, W=10 in a case that the subcarrier spacing is 15 kHz, and W=40 in a case that the subcarrier spacing is 60 kHz. FIG. 2 illustrates a case of X=7 as an example. Note that the example in FIG. 2 may be similarly extended also in a case of X=14. Furthermore, the uplink slot is defined similarly, and the downlink slot and the uplink slot may be defined separately. A bandwidth of the cell in FIG. 2 may also be defined as a part band (BandWidth Part (BWP)). However, a BWP used in the downlink may be referred to as a downlink BWP, and a BWP used in the uplink may be referred to as an uplink BWP. In addition, the slot may be referred to as a Transmission Time Interval (TTI). The slot need not be defined as a TTI. The TTI may be a transmission period for transport blocks.

The signal or the physical channel transmitted in each of the slots may be represented by a resource grid. The resource grid is defined by multiple subcarriers and multiple OFDM symbols for each numerology (subcarrier spacing and cyclic prefix length) and for each carrier. The number of subcarriers constituting one slot depends on each of the downlink and uplink bandwidths of a cell. Each element in the resource grid is referred to as a resource element. The resource element may be identified by using a subcarrier number and an OFDM symbol number.

The resource grid is used to represent mapping of a certain physical downlink channel (such as the PDSCH) or a certain physical uplink channel (such as the PUSCH) to resource elements. For example, for a subcarrier spacing of 15 kHz, in a case that the number X of OFDM symbols included in a subframe is 14 and NCPs are used, one physical resource block (Physical Resource Block (PRB)) is defined by 14 continuous OFDM symbols in the time domain and by 12*Nmax continuous subcarriers in the frequency domain. Nmax represents the maximum number of resource blocks (RBs) determined by a subcarrier spacing configuration u described below. In other words, the resource grid includes (14*12*Nmax, μ) resource elements. Extended CPs (ECPs) are supported only at a subcarrier spacing of 60 kHz, and thus one physical resource block is defined by 12 (the number of OFDM symbols included in one slot)*4 (the number of slots included in one subframe) in the time domain=48 continuous OFDM symbols, 12*Nmax, u continuous subcarriers in the frequency domain, for example. In other words, the resource grid includes (48*12*Nmax, μ) resource elements.

As resource blocks, a reference resource block, a common resource block (Common RB (CRB)), a physical resource block, and a virtual resource block are defined. One resource block is defined as 12 subcarriers that are continuous in the frequency domain. Reference resource blocks are common to all subcarriers, and for example, resource blocks may be configured at a subcarrier spacing of 15 kHz and may be numbered in ascending order. Subcarrier index 0 at reference resource block index 0 may be referred to as reference point A (point A) (which may simply be referred to as a "reference point"). The common resource blocks are resource blocks numbered in ascending order from 0 at each subcarrier spacing configuration u starting at the reference point A. The resource grid described above is defined by the common resource blocks. The physical resource blocks are resource blocks numbered in ascending order from 0 included in a part band (BandWidth (BWP)), and the physical resource blocks are resource blocks numbered in ascending order from 0 included in the BWP. A certain physical uplink channel is first mapped to a virtual resource block. There-after, the virtual resource block is mapped to a physical resource block. Hereinafter, the resource block may be a virtual resource block, a physical resource block, a common resource block, or a reference resource block.

The BWP is a subset of continuous resource blocks (which may be common resource blocks) with a subcarrier spacing configuration in a carrier. The terminal apparatus 1 may be configured with up to four BWPs (downlink BWPs) in the downlink. There may be one downlink BWP active at a certain time (active downlink BWP). The terminal appa-ratus 1 may not expect to receive a PDSCH, a PDCCH, or a CSI-RS outside the band of the active downlink BWP. The terminal apparatus 1 may be configured with up to four BWPs (uplink BWPs) in the uplink. There may be one uplink BWP active at a certain time (active uplink BWP). The terminal apparatus 1 transmits neither a PUCCH nor a PUSCH outside the band of the active uplink BWP.

Now, the subcarrier spacing configuration u will be described. As described above, one or multiple OFDM numerologies are supported in NR. In a certain BWP, the subcarrier spacing configuration $\mu$ ($\mu$=0, 1, . . . , 5) and the cyclic prefix length are given for a downlink BWP by a higher layer and for an uplink BWP by a higher layer. In this regard, given $\mu$, a subcarrier spacing $\Delta f$ is given by $\Delta f=2^{\mu}*15$ (kHz).

At the subcarrier spacing configuration u, the slots are counted in ascending order from 0 to $N^{\hat{}}\{subframe, \mu\}\_\{slot\}-1$ within the subframe, and counted in ascending order from 0 to $N^{\hat{}}\{frame, \mu\}\_\{slot\}-1$ within the frame. $N^{\hat{}}\{slot\}\_\{symb\}$ continuous OFDM symbols are in the slot, based on the slot configuration and the cyclic prefix. $N^{\hat{}}\{slot\}\_\{symb\}$ is 14. The start of the slot $n^{\hat{}}\{\mu\}\_\{s\}$ within the subframe is temporally aligned with the start of the $n^{\hat{}}\{\mu\}\_\{s\} *N^{\hat{}}\{slot\}\_\{symb\}$th OFDM symbol within the same subframe.

Figure 3:
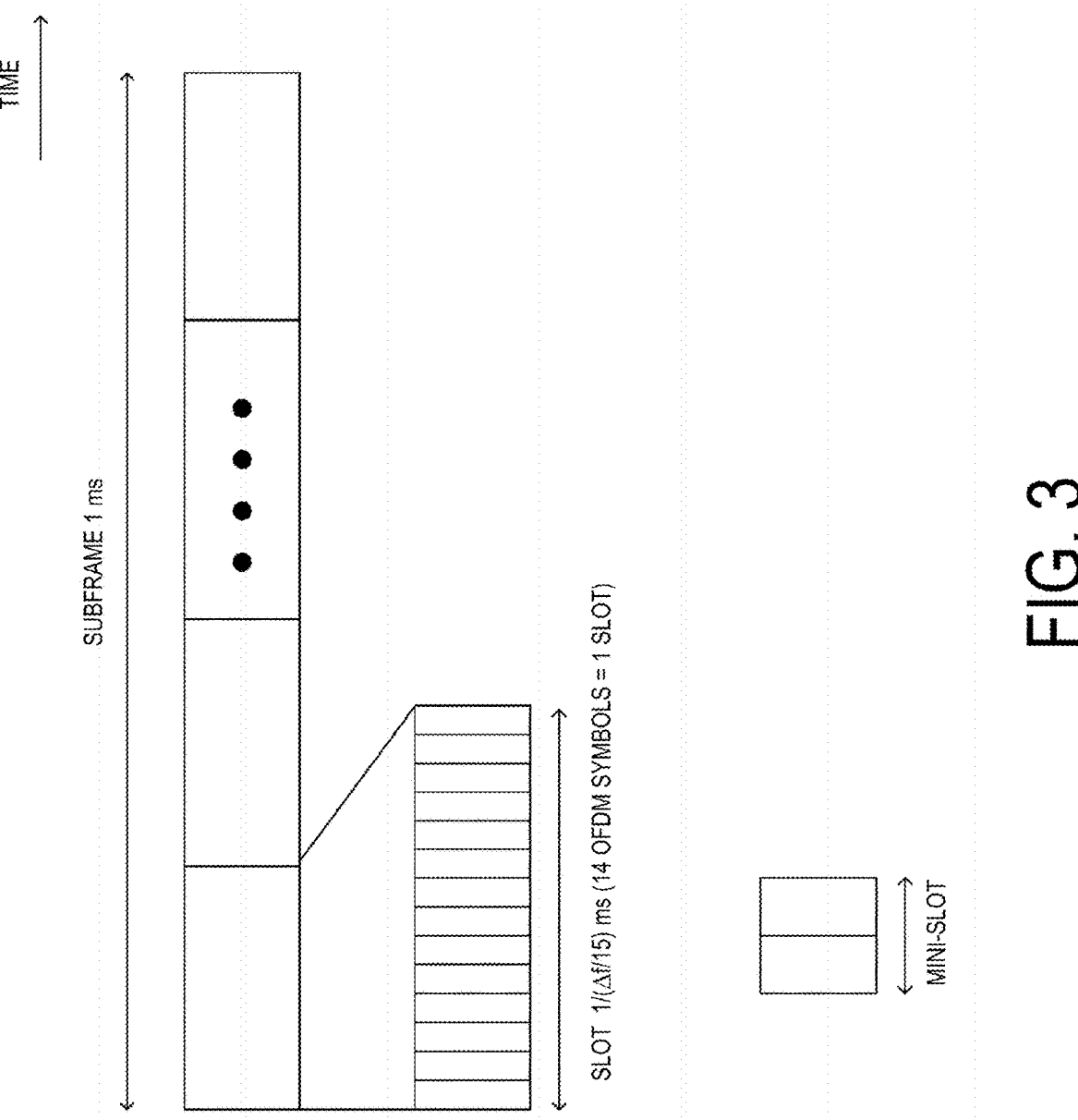
FIG. 3 is a diagram illustrating a relationship of a subframe, a slot, and a mini-slot in a time domain according to an embodiment of the present invention.

The subframe, the slot, and a mini-slot will now be described. FIG. 3 is a diagram illustrating an example of the relationship between the subframe, the slot, and the mini-slot in the time domain. As illustrated in FIG. 3, three types of time units are defined. The subframe is 1 ms regardless of the subcarrier spacing. The number of OFDM symbols included in the slot is 7 or 14 (but may be 6 or 12 in a case that the cyclic prefix (CP) added to each symbol is an Extended CP), and the slot length depends on the subcarrier spacing. Here, in a case that the subcarrier spacing is 15 kHz, one subframe includes 14 OFDM symbols. The downlink slot may be referred to as PDSCH mapping type A. The uplink slot may be referred to as PUSCH mapping type A.

The mini-slot (which may be referred to as a subslot) is a time unit including OFDM symbols that are less in number than the OFDM symbols included in one slot. FIG. 3 illustrates, by way of example, a case in which the mini-slot includes 2 OFDM symbols. The OFDM symbols in the mini-slot may match the timing for the OFDM symbols constituting the slot. Note that the minimum unit of sched-uling may be a slot or a mini-slot. Additionally, allocation of mini-slots may be referred to as non-slot based scheduling.

Mini-slots being scheduled may also be expressed as resources being scheduled for which the relative time posi-tions of the start positions of the reference signal and the data are fixed. The downlink mini-slot may be referred to as PDSCH mapping type B. The uplink mini-slot may be referred to as PUSCH mapping type B.

In the terminal apparatus 1, a transmission direction (for uplink, downlink, or flexible) of the symbol in each slot is configured by the higher layer using an RRC message including a prescribed higher layer parameter received from the base station apparatus 3 or is configured by a PDCCH in a specific DCI format (for example, DCI format 2_0) received from the base station apparatus 3. In the present embodiment, in each slot, one for configuring each symbol in the slot as uplink, downlink, and flexible is referred to as a slot format. One slot format may include a downlink symbol, an uplink symbol, and a flexible symbol.

In the downlink according to the present embodiment, a carrier corresponding to the serving cell is referred to as a downlink component carrier (or a downlink carrier). In the uplink according to the present embodiment, a carrier cor-responding to the serving cell is referred to as an uplink component carrier (or an uplink carrier). In the sidelink according to the present embodiment, a carrier correspond-ing to the serving cell is referred to as a sidelink component carrier (or a sidelink carrier). The downlink component carrier, the uplink component carrier, and/or the sidelink component carrier are collectively referred to as a compo-nent carrier (or a carrier).

Physical channels and physical signals according to the present embodiment will be described.

In FIG. 1, the following physical channels are used for radio communication between the terminal apparatus 1 and the base station apparatus 3.

Physical Broadcast CHannel (PBCH)

Physical Downlink Control CHannel (PDCCH)

Physical Downlink Shared CHannel (PDSCH)

Physical Uplink Control CHannel (PUCCH)

Physical Uplink Shared CHannel (PUSCH)

Physical Random Access CHannel (PRACH)

The PBCH is used to broadcast essential information block (Master Information Block (MIB), Essential Informa-tion Block (EIB), and Broadcast Channel (BCH)) which includes essential system information needed by the termi-nal apparatus 1. The MIB may include information for specifying a number of a radio frame (also referred to as a system frame) (System Frame Number (SFN)) to which the PBCH is mapped, information for specifying a subcarrier spacing of a System Information Block 1 (SIB1), informa-tion indicating a frequency domain offset between a grid of the resource blocks and an SS/PBCH block (also referred to as a synchronization signal block, an SS block, an SSB), and information indicating a configuration related to the PDCCH for the SIB1. Here, the SIB1 includes information necessary for evaluating whether the terminal apparatus 1 is allowed to connect to the cell, and includes information for determining scheduling of other system information (System Information Block (SIB)). Here, the information indicating the configu-ration related to the PDCCH for the SIB1 may be informa-tion for determining a control resource set (ControlRe-sourceSet (CORESET) 0 (CORESET 0 is also referred to as CORESET #0 or common CORESET), a common search space, and/or necessary PDCCH parameters. Here, the CORESET indicates a resource element of the PDCCH, and includes a set of PRBs in a time period of a certain number of OFDM symbols (for example, one to three symbols). The CORESET 0 may be a CORESET for at least a PDCCH scheduling the SIB1. The CORESET 0 may be configured in the MIB or may be configured through RRC signalling.

The PBCH may be used to broadcast information for specifying a number of a radio frame (also referred to as a system frame) (System Frame Number (SFN)) to which the PBCH is mapped and/or information for specifying a Half Radio Frame (HRF) (also referred to as a half frame). Here, the half radio frame is a time frame having the 5 ms length, and the information for specifying the half radio frame may be information for specifying whether the first half 5 ms or the second half 5 ms of the radio frame of 10 ms.

The PBCH may be used to broadcast time indexes within the period of the SS/PBCH blocks. Here, the time index is information indicating the indexes of the synchronization signals and the PBCHs within the cell. The time index may be referred to as an SSB index or an SS/PBCH block index. For example, in a case that the SS/PBCH block is transmitted using the assumption of multiple transmit beams, transmission filter configuration, and/or a Quasi Co-Location (QCL) related a reception spatial parameter, an order of time within a predetermined periodicity or within a configured periodicity may be indicated. Additionally, the terminal apparatus may recognize the difference in time index as a difference the in the assumption of the transmit beams, the transmission filter configuration, and/or the Quasi Co-Location (QCL) related the reception spatial parameter.

The PDCCH is used to transmit (or carry) Downlink Control Information (DCI) in a case of downlink radio communication (radio communication from the base station apparatus 3 to the terminal apparatus 1). Here, one or multiple pieces of DCI (which may be referred to as DCI formats) are defined for transmission of the downlink control information. In other words, a field for the downlink control information is defined as DCI and is mapped to information bits. The PDCCH is transmitted in a PDCCH candidate. The terminal apparatus 1 monitors a set of PDCCH candidates in the serving cell. Here, the monitoring may mean an attempt to decode the PDCCH in accordance with a certain DCI format.

For example, the following DCI format may be defined.

DCI format 0_0)
DCI format 0_1
DCI format 0_2
DCI format 1_0
DCI format 1_1
DCI format 1_2
DCI format 2_0
DCI format 2_1
DCI format 2_2
DCI format 2_3

DCI format 0_0 may be used for scheduling of the PUSCH in a certain serving cell. DCI format 0_0 may include information indicating PUSCH scheduling information (frequency domain resource allocation and time domain resource allocation). A Cyclic Redundancy Check (CRC) may be added to DCI format 0_0, the CRC being scrambled with, among Radio Network Temporary Identifiers (RNTIs) being identifiers, any one of a Cell-RNTI (C-RNTI), a Configured Scheduling (CS)-RNTI, an MCS-C-RNTI, and/or a Temporary C-NRTI (TC-RNTI). DCI format 0_0 may be monitored in a common search space or a UE-specific search space.

DCI format 0_1 may be used for scheduling of the PUSCH in a certain serving cell. DCI format 0_1 may include information indicating the PUSCH scheduling information (frequency domain resource allocation and time domain resource allocation), information indicating the BWP, a Channel State Information (CSI) request, a Sounding Reference Signal (SRS) request, and/or information related to antenna ports. A CRC scrambled with any one of RNTIs including the C-RNTI, the CS-RNTI, a Semi Persistent (SP)-CSI-RNTI, and/or the MCS-C-RNTI may be added to DCI format 0_1. DCI format 0_1 may be monitored in the UE-specific search space.

DCI format 0_2 may be used for scheduling of the PUSCH in a certain serving cell. DCI format 0_2 may include information indicating the PUSCH scheduling information (frequency domain resource allocation and time domain resource allocation), information indicating the BWP, a CSI request, an SRS request, and/or information related to the antenna ports. A CRC scrambled with any one of RNTIs including the C-RNTI, the CSI-RNTI, the SP-CSI-RNTI, and/or the MCS-C-RNTI may be added to DCI format 0_2. DCI format 0_2 may be monitored in the UE-specific search space. DCI format 0_2 may be referred to as a DCI format 0_1A or the like.

DCI format 1_0 may be used for scheduling of the PDSCH in a certain serving cell. DCI format 1_0 may include information indicating PDSCH scheduling information (frequency domain resource allocation and time domain resource allocation). A CRC scrambled with any one of identifiers including the C-RNTI, the CS-RNTI, the MCS-C-RNTI, a Paging RNTI (P-RNTI), a System Information (SI)-RNTI, a Random access (RA)-RNTI, and/or the TC-RNTI may be added to DCI format 1_0. DCI format 1_0 may be monitored in the common search space or the UE-specific search space.

DCI format 1_1 may be used for scheduling of the PDSCH in a certain serving cell. DCI format 1_1 may include information indicating the PDSCH scheduling information (frequency domain resource allocation and time domain resource allocation), information indicating the BWP, Transmission Configuration Indication (TCI), and/or information related to the antenna ports. A CRC scrambled with any one of RNTIs including the C-RNTI, the CS-RNTI, and/or the MCS-C-RNTI may be added to DCI format 1_1. DCI format 1_1 may be monitored in the UE-specific search space.

DCI format 1_2 may be used for scheduling of the PDSCH in a certain serving cell. DCI format 1_2 may include information indicating PDSCH scheduling information (frequency domain resource allocation and time domain resource allocation), information indicating the BWP, TCI, and/or information related to the antenna ports. A CRC scrambled with any one of RNTIs including the C-RNTI, the CS-RNTI, and/or the MCS-C-RNTI may be added to DCI format 1_2. DCI format 1_2 may be monitored in the UE-specific search space. DCI format 1_2 may be referred to as DCI format 1_1A or the like.

DCI format 2_0 is used to notify the slot format of one or multiple slots. The slot format is defined as a format in which each OFDM symbol in the slot is classified as downlink, flexible, or uplink. For example, in a case that the slot format is 28, DDDDDDDDDDDDDFU is applied to the 14 OFDM symbols in the slot for which slot format 28 is indicated. Here, D is a downlink symbol, F is a flexible symbol, and U is an uplink symbol. Note that the slot will be described below.

DCI format 2_1 is used to notify the terminal apparatus 1 of physical resource blocks (PRB or RB) and OFDM symbols which may be assumed to involve no transmission. Note that this information may be referred to as a preemption indication (intermittent transmission indication).

DCI format 2_2 is used for transmission of the PUSCH and a Transmit Power Control (TPC) command for the PUSCH.

DCI format 2_3 is used to transmit a group of TPC commands for transmission of sounding reference signals (SRSs) by one or multiple terminal apparatuses 1. Additionally, the SRS request may be transmitted along with the TPC command. In addition, the SRS request and the TPC command may be defined in DCI format 2_3 for uplink with no PUSCH and PUCCH or uplink in which the transmit power control for the SRS is not associated with the transmit power control for the PUSCH.

Here, the DCI for the downlink is also referred to as downlink grant or downlink assignment. Here, the DCI for the uplink is also referred to as uplink grant or Uplink assignment. The DCI may also be referred to as a DCI format.

CRC parity bits added to the DCI format transmitted on one PDCCH are scrambled with the SI-RNTI, the P-RNTI, the C-RNTI, the CS-RNTI, the RA-RNTI, or the TC-RNTI. The SI-RNTI may be an identifier used for broadcasting of the system information. The P-RNTI may be an identifier used for paging and notification of system information modification. The C-RNTI, the MCS-C-RNTI, and the CS-RNTI are identifiers for identifying a terminal apparatus within a cell. The TC-RNTI is an identifier for identifying the terminal apparatus 1 that has transmitted a random access preamble during a contention based random access procedure.

The C-RNTI is used to control the PDSCH or the PUSCH in one or multiple slots. The CS-RNTI is used to periodically allocate a resource for the PDSCH or the PUSCH. The MCS-C-RNTI is used to indicate the use of a prescribed MCS table for grant-based transmission. The TC-RNTI is used to control PDSCH transmission or PUSCH transmission in one or multiple slots. The TC-RNTI is used to schedule re-transmission of a random access message 3 and transmission of a random access message 4. The RA-RNTI is determined in accordance with frequency and time location information regarding the physical random access channel on which the random access preamble has been transmitted.

For the C-RNTI and/or the other RNTIs, different values corresponding to the type of traffic on the PDSCH or the PUSCH may be used. For the C-RNTI and the other RNTIs, different values corresponding to the service type (eMBB, URLLC, and/or mMTC) of the data transmitted on the PDSCH or PUSCH may be used. The base station apparatus 3 may use the RNTI having a different value corresponding to the service type of the data transmitted. The terminal apparatus 1 may identify the service type of the data transmitted on the associated PDSCH or PUSCH, based on the value of the RNTI applied to the received DCI (used for the scrambling).

The PUCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Down-link-Shared CHannel (DI-SCH)).

The PDSCH is used to transmit downlink data (Downlink Shared CHannel (DI-SCH)) from a Medium Access Control (MAC) layer. In a case of the downlink, the PDSCH is also used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. The PUSCH may be used to transmit CSI only or a HARQ-ACK and CSI only. In other words, the PUSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive an RRC message (also referred to as RRC information or RRC signalling) in a radio resource control (RRC) layer. In a Medium Access Control (MAC) layer, the base station apparatus 3 and the terminal apparatus 1 may transmit and/or receive a MAC control element. Additionally, the RRC layer of the terminal apparatus 1 acquires system information broadcast from the base station apparatus 3. In this regard, the RRC message, the system information, and/or the MAC control element are also referred to as higher layer signaling or a higher layer parameter. Each of the parameters included in the higher layer signaling received by the terminal apparatus 1 may be referred to as a higher layer parameter. The higher layer as used herein means a higher layer as viewed from the physical layer, and thus may include one or multiple of the MAC layer, the RRC layer, an RIC layer, a PDCP layer, a Non Access Stratum (NAS) layer, and the like. For example, in the processing of the MAC layer, the higher layer may include one or multiple of the RRC layer, the RLC layer, the PDCP layer, the NAS layer, and the like. Hereinafter, "A is given (provided) in the higher layer" or "A is given (provided) by the higher layer" may mean that the higher layer (mainly the RRC layer, the MAC layer, or the like) of the terminal apparatus 1 receives A from the base station apparatus 3, and that the received A is given (provided) from the higher layer of the terminal apparatus 1 to the physical layer of the terminal apparatus 1. For example. "a higher layer parameter being provided" in the terminal apparatus 1 may mean that higher layer signaling is received from the base station apparatus 3, and a higher layer parameter included in the received higher layer signaling is provided from the higher layer of the terminal apparatus 1 to the physical layer of the terminal apparatus 1. A higher layer parameter being configured for the terminal apparatus 1 may mean that the higher layer parameter is given (provided) to the terminal apparatus 1. For example, a higher layer parameter being configured for the terminal apparatus 1 may mean that the terminal apparatus 1 receives higher layer signaling from the base station apparatus 3 and configures the received higher layer parameter in the higher layer. However, a higher layer parameter being configured for the terminal apparatus 1 may include a default parameter given in advance being configured in the higher layer of the terminal apparatus 1.

The PDSCH or the PUSCH may be used to transmit the RRC signalling and the MAC control element. The RRC signalling transmitted on the PDSCH from the base station apparatus 3 may be signaling common to multiple terminal apparatuses 1 in a cell. The RRC signalling transmitted from the base station apparatus 3 may be dedicated signaling for a certain terminal apparatus 1 (also referred to as dedicated signaling). In other words, terminal apparatus-specific (UE-specific) information may be transmitted through dedicated signaling to the certain terminal apparatus 1. Additionally, the PUSCH may be used to transmit UE Capabilities in the uplink.

In FIG. 1, the following downlink physical signals are used for downlink radio communication. Here, the downlink physical signals are not used to transmit information output from the higher layers but are used by the physical layer.

Synchronization signal (SS)

Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in a frequency domain and a time domain in the downlink. Here, the synchronization signal may be used for the terminal apparatus 1 to select precoding or a beam in precoding or beamforming performed by the base station apparatus 3. Note that the beam may be referred to as a transmission or reception filter configuration, or a spatial domain transmission filter or a spatial domain reception filter.

A reference signal is used for the terminal apparatus 1 to perform channel compensation on a physical channel. Here, the reference signal is used for the terminal apparatus 1 to calculate the downlink CSI. Furthermore, the reference signal may be used for a numerology such as a radio parameter or subcarrier spacing, or used for fine synchronization that allows FFT window synchronization to be achieved.

According to the present embodiment, at least one of the following downlink reference signals are used.

Demodulation Reference Signal (DMRS)

Channel State Information Reference Signal (CSI-RS)

Phase Tracking Reference Signal (PTRS)

Tracking Reference Signal (TRS)

The DMRS is used to demodulate a modulated signal. Note that two types of reference signals may be defined as the DMRS: a reference signal for demodulating the PBCH and a reference signal for demodulating the PDSCH or that both reference signals may be referred to as the DMRS. The CSI-RS is used for measurement of Channel State Information (CSI) and beam management, and a transmission method for a periodic, semi-persistent, or aperiodic CSI reference signal is applied to the CSI-RS. For the CSI-RS, a Non-Zero Power (NZP) CSI-RS and a CSI-RS with zero transmit power (or receive power) (Zero Power (ZP)) may be defined. Here, the ZP CSI-RS may be defined as a CSI-RS resource that has zero transmit power or that is not transmitted. The PTRS is used to track phase on the time axis to ensure frequency offset caused by phase noise. The TRS is used to ensure Doppler shift during fast movement. Note that the TRS may be used as one configuration of the CSI-RS. For example, a radio resource may be configured with the CSI-RS for one port as a TRS.

According to the present embodiment, one or multiple of the following uplink reference signals are used.

Demodulation Reference Signal (DMRS)

Phase Tracking Reference Signal (PTRS)

Sounding Reference Signal (SRS)

The DMRS is used to demodulate a modulated signal. Note that two types of reference signals may be defined as the DMRS: a reference signal for demodulating the PUCCH and a reference signal for demodulating the PUSCH or that both reference signals may be referred to as the DMRS. The SRS is used for measurement of uplink channel state information (CSI), channel sounding, and beam management.

The PTRS is used to track phase on the time axis to ensure frequency offset caused by phase noise.

In the present embodiment, the downlink physical channel and/or the downlink physical signal are collectively referred to as a downlink signal. In the present embodiment, the uplink physical channel and/or the uplink physical signal are collectively referred to as an uplink signal. In the present embodiment, the downlink physical channel and/or the uplink physical channel are collectively referred to as a physical channel. In the present embodiment, the downlink physical signal and/or the uplink physical signal are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Figure 4:
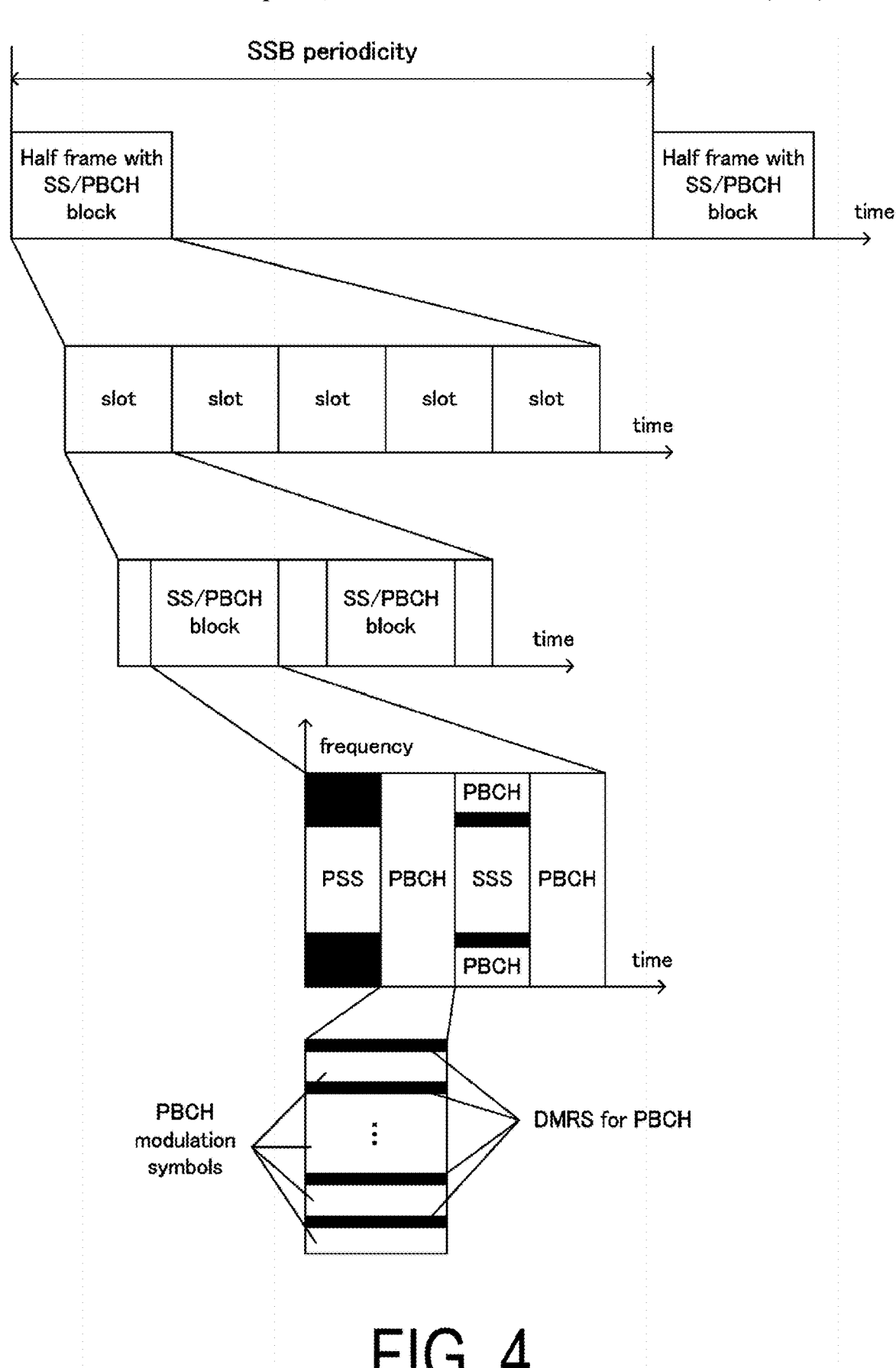
FIG. 4 is a diagram illustrating an example of an SS/PBCH block and an SS burst set according to an embodiment of the present invention.

FIG. 4 is a diagram illustrating an example of SS/PBCH blocks (also referred to as synchronization signal blocks, SS blocks, and SSBs) and half frames (which may be referred to as half frame with SS/PBCH block or SS burst sets) in which one or more SS/PBCHs are transmitted according to the present embodiment. FIG. 4 illustrates an example in which two SS/PBCH blocks are included in the SS burst set present with a certain period (which may be referred to as an SSB period), and the SS/PBCH block includes continuous four OFDM symbols.

The SS/PBCH block may be a block including a synchronization signal (PSS, SSS), a PBCH, and a DMRS for the PBCH. However, the SS/PBCH block may be a block including a synchronization signal (PSS and SSS), a RED-CAP PBCH, and a DMRS for the REDCAP PBCH. Transmitting the signals/channels included in the SS/PBCH block is described as transmitting the SS/PBCH block. In a case of transmitting the synchronization signals and/or the PBCHs using one or multiple SS/PBCH blocks in the SS burst set, the base station apparatus 3 may use an independent downlink transmit beam for each SS/PBCH block.

In FIG. 4, the PSS, the SSS, the PBCH and the DMRS for the PBCH are time/frequency multiplexed in one SS/PBCH block. FIG. 5 is a table illustrating resources in which a PSS, an SSS, a PBCH, and a DMRS for the PBCH are mapped in the SS/PBCH block.

The PSS may be mapped to the first symbol in the SS/PBCH block (an OFDM symbol having an OFDM symbol number of 0 relative to a start symbol of the SS/PBCH block). A PSS sequence may include 127 symbols and may be mapped to the 57th subcarrier to the 183rd subcarrier in the SS/PBCH block (subcarriers having subcarrier numbers of 56 to 182 relative to a start subcarrier of the SS/PBCH block).

The SSS may be mapped to the third symbol in the SS/PBCH block (the OFDM symbol having the OFDM symbol number of 2 relative to the start symbol of the SS/PBCH block). An SSS sequence may include 127 symbols and may be mapped to the 57th subcarrier to the 183rd subcarrier in the SS/PBCH block (the subcarriers having the subcarrier numbers of 56 to 182 relative to the start subcarrier of the SS/PBCH block).

The PBCH and the DMRS may be mapped to the second, third, and fourth symbols in the SS/PBCH block (the OFDM symbols having the OFDM symbol numbers of 1, 2, and 3 relative to the start symbol of the SS/PBCH block). A PBCH modulation symbol sequence may include $M_{symb}$ symbols and may be mapped to resources to which no DMRS is mapped among the first subcarrier to the 240th subcarrier of the second and fourth symbols in the SS/PBCH block (the subcarriers having the subcarrier numbers of 0 to 239 relative to the start subcarrier of the SS/PBCH block) and the first subcarrier to the 48th subcarrier and the 184th to the 240th subcarrier of the third symbol in the SS/PBCH block (the subcarriers having the subcarrier numbers of 0 to 47 and 192 to 239 relative to the start subcarrier of the SS/PBCH block). A DMRS symbol sequence may include 144 symbols and may be mapped to the first subcarrier to the 240th subcarrier of the second and fourth symbols in the SS/PBCH block (the subcarriers having the subcarrier numbers of 0 to 239 relative to the start subcarrier of the SS/PBCH block) and the first subcarrier to the 48th subcarrier and the 184th to the 240th subcarrier of the third symbol in the SS/PBCH block (the subcarriers having the subcarrier numbers of 0) to 47 and 192 to 239 relative to the start subcarrier of the SS/PBCH block), in which one subcarrier is mapped every four subcarriers. For example, for 240 subcarriers, the PBCH modulation symbols may be mapped to 180 subcarriers, and the DMRS for the PBCH may be mapped to 60 subcarriers.

A different SS/PBCH block in the SS burst set may be assigned with a different SSB index. An SS/PBCH block assigned with an SSB index may be periodically transmitted based on the SSB period by the base station apparatus 3. For example, the SSB period for the SS/PBCH block to be used for an initial access and the SSB period configured for the connected (Connected or RRC_Connected) terminal apparatus 1 may be defined. Furthermore, the SSB period configured for the connected (Connected or RRC_Connected) terminal apparatus 1 may be configured by use of RRC parameters. Additionally, the SSB period configured for the connected (Connected or RRC_Connected) terminal apparatus 1 may be a period of a radio resource in the time domain during which transmission is potentially to be performed, and in practice, whether the transmission is to be performed may be determined by the base station apparatus 3. Furthermore, the SSB period for the SS/PBCH block to be used for the initial access may be predefined in specifications or the like. For example, the terminal apparatus 1 performing the initial access may regard the SSB period as 20 milliseconds.

A time position of the SS burst set to which the SS/PBCH block is mapped may be specified based on the information for specifying the system frame number (SFN) and/or the information for specifying the half frame included in the PBCH. The terminal apparatus 1 receiving the SS/PBCH block may specify the current system frame number and half frame based on the received SS/PBCH block.

The SS/PBCH block is assigned with the SSB index (which may be referred to as the SS/PBCH block index) depending on the temporal position in the SS burst set. The terminal apparatus 1 specifies the SSB index based on the information of the PBCH and/or information of the reference signal included in the detected SS/PBCH block.

The SS/PBCH blocks with the same relative time in each SS burst set in the multiple SS burst sets may be assigned with the same SSB index. The SS/PBCH blocks with the same relative time in each SS burst set in the multiple SS burst sets may be assumed to be QCLed (or the same downlink transmit beam may be assumed to be applied to these SS/PBCH blocks). In addition, antenna ports in the SS/PBCH blocks with the same relative time in each SS burst set in the multiple SS burst sets may be assumed to be QCLed for average delay, Doppler shift, and spatial correlation.

Within a certain SS burst set period, the SS/PBCH block assigned with the same SSB index may be assumed to be QCLed for average delay, average gain, Doppler spread, Doppler shift, and spatial correlation. A configuration corresponding to one or multiple SS/PBCH blocks (or the SS/PBCH blocks may be reference signals) that are QCLed may be referred to as a QCL configuration.

The number of SS/PBCH blocks (which may be referred to as the number of SS blocks or the SSB number) may be defined as, for example, the number of SS/PBCH blocks within an SS burst, an SS burst set, or an SS/PBCH block period. Additionally, the number of SS/PBCH blocks may indicate the number of beam groups for cell selection within the SS burst, the SS burst set, or the SS/PBCH block period. Here, the beam group may be defined as the number of different SS/PBCH blocks or the number of different beams included in the SS burst, the SS burst set, or the SS/PBCH block period (SSB period).

The SS/PBCH blocks with the same relative time in each SS burst set in the multiple SS burst sets may be assigned with the same SSB index. The SS/PBCH blocks with the same relative time in each SS burst set in the multiple SS burst sets may be assumed to be QCLed (or the same downlink transmit beam may be assumed to be applied to these SS/PBCH blocks). In addition, antenna ports in the SS/PBCH blocks with the same relative time in each SS burst set in the multiple SS burst sets may be assumed to be QCLed for average delay, Doppler shift, and spatial correlation.

Within a certain SS burst set period, the SS/PBCH block assigned with the same SSB index may be assumed to be QCLed for average delay, average gain, Doppler spread, Doppler shift, and spatial correlation.

The terminal apparatus 1 according to the present embodiment determines whether or not to consider a cell as a "barred" cell based on a connection state, a running state of a prescribed timer, information of a received MIB, and/or information of a received SIB (which may be a SIB1) in the cell. However, the barred cell may be a cell which the terminal apparatus 1 is not allowed to camp on. The cell is barred by an indication in the system information. For example, the terminal apparatus 1 does not camp on the barred cell. In a case that the terminal apparatus 1 cannot acquire the MIB in a cell, the terminal apparatus 1 may consider the cell as the barred cell.

In a case that a cell is not a barred cell (or in a case that a cell status is indicated as "not barred"), the terminal apparatus 1 may treat the cell as a candidate cell in cell selection and cell reselection.

In a case that a cell is a barred cell (or in a case that the cell status is indicated as "barred" or in a case that the cell status is treated as "barred"), the terminal apparatus 1 is prohibited from selecting and reselecting the cell and selects another cell. In a case that a cell is a barred cell, the terminal apparatus 1 may select/reselect another cell based on the MIB. For example, in a case that it is indicated that selection/reselection of the same frequency is prohibited in the field included in the MIB, the terminal apparatus 1 may treat all the other cells of the same frequency as the barred cells and may not treat the other cells as the candidates in the reselection.

The terminal apparatus 1 according to the present embodiment in a cell determines whether or not to consider the cell as a "barred" cell based on the received MIB in a case that the connection state is an RRC idle state (RRC_IDLE), an RRC inactive state (RRC_INACTIVE), or an RRC connected state (RRC_CONNECTED) while a timer T311 is running. However, the timer T311 is a timer which runs at the time of a reestablishment procedure of the RRC connection, and in a case that the timer expires, the terminal apparatus 1 sets the connection state to the RRC idle state.

In a case that a value of a parameter cellBarred included in the received MIB in a cell is a prescribed value, the terminal apparatus 1 considers the cell as a barred cell. Where the parameter cellBarred is a parameter indicating whether the corresponding cell is barred or not. However, the parameter cellBarred may be ignored in a case that the terminal apparatus 1 is a prescribed terminal apparatus (for example, REDCAP UE). In a case that a parameter cellBarred-rc different from the parameter cellBarred included in the received MIB is a prescribed value, the terminal apparatus 1 may consider the cell as a barred cell. Where the parameter cellBarred-rc is a parameter indicating whether the corresponding cell is barred for a prescribed terminal apparatus (e.g., REDCAP UE). However, the parameter cellBarred-re may be ignored in a case that the terminal apparatus 1 is other than the prescribed terminal apparatus (for example, REDCAP UE). However, the information indicated by the parameter cellBarred-rc may be realized by another parameter included in the MIB. For example, in a case that a parameter related to the configuration of the CORESET 0 is included in the MIB and the parameter indicates a prescribed value, the terminal apparatus 1 may consider the cell as a barred cell. In a case that none of the parameters included in the received MIB indicates that the cell is a barred cell, the terminal apparatus 1 may apply another parameter (for example, information indicating the SFN) included in the MIB.

The terminal apparatus 1 according to the present embodiment determines whether or not to consider the cell as a "barred" cell based on the parameter of the received SIB1 (which may be the REDCAPSIB1 or another SIB) in a case that the connection state is not an RRC connected state while the timer T311 is not running (not in RRC_CONNECTED while T311 is not running).

The base station apparatus 3 according to the present embodiment transmits, to the terminal apparatus 1, a SIB1 (which may be another SIB) including a parameter for the terminal apparatus 1 in a cell to determine whether or not the cell is barred.

An initial BWP, an initial downlink BWP (initial Dl. BWP), and an initial uplink BWP (initial UL BWP) according to the present embodiment may be at least a BWP, a downlink BWP, and an uplink BWP used at the time of the initial access before the RRC connection is established, respectively. However, the initial BWP, the initial downlink BWP, and the initial uplink BWP may be used after the RRC connection is established. However, the initial BWP, the initial downlink BWP, and the initial uplink BWP may be a BWP, a downlink BWP, and an uplink BWP having indexes of 0 (#0), respectively.

The initial downlink BWP may be configured by use of a parameter provided in the MIB, a parameter provided in the SIB1, a parameter provided in the SIB, and/or an RRC parameter. For example, the initial downlink BWP may be configured by use of a parameter initialDownlinkBWP provided in the SIB1. However, initialDownlinkBWP may be a parameter indicating a UE-specific, dedicated) configuration of the initial downlink BWP.

The SIB1 may include a common downlink configuration parameter downlinkConfigCommon of a cell. At least one of the parameters for the terminal apparatus 1 in a cell to determine whether or not the cell is barred may be included in downlink ConfigCommon indicating the common downlink parameter of the cell. The parameter downlinkConfig-Common may include a parameter indicating a basic parameter related to one downlink carrier and transmission in the corresponding cell (e.g., referred to as frequencyInfoDL) and a parameter indicating an initial downlink BWP configuration of a serving cell (e.g., referred to as initialDownlinkBWP). The SIB1 may include a parameter allocationBandwidth indicating the maximum allocation bandwidth of a cell. The parameter allocationBandwidth may be included in any parameter in the SIB1.

An Information Element (IE) of the BWP may be a parameter indicating a frequency location and bandwidth of the BWP. The information elements of the BWP may include a parameter subcarrierSpacing indicating a subcarrier spacing used in the BWP, a parameter location AndBandwidth indicating a location and a bandwidth in the frequency domain (the number of resource blocks) of the BWP, and/or a parameter cyclicPrefix indicating whether a standard cyclic prefix (CP) or an extended CP is used in the BWP. That is, the BWP may be defined by the subcarrier spacing, the CP, and the location and the bandwidth in the frequency domain. However, a value indicated by locationAndBandwidth may be interpreted as a Resource Indicator Value (RIV). The resource indicator value indicates a starting PRB index of the BWP and the number of continuous PRBs. However, the first PRB defining a field of the resource indicator value may be a PRB determined by a subcarrier spacing given by subcarrierSpacing of the BWP and offset-ToCarrier configured by use of SCS-SpecificCarrier included in FrequencyInfoDl. (or FrequencyInfoDL-SIB) or FrequencyInfoUL, (or FrequencyInfoUl-SIB) corresponding to the subcarrier spacing. Also, a size defining the field of the resource indicator value may be 275.

The parameter initialDownlinkBWP includes information elements of the BWP, information elements of the PDCCH configuration, and/or information elements of the PDSCH configuration in the corresponding cell. However, the initial downlink BWP may be configured by the network to include the CORESET 0 in the frequency domain.

The parameter frequencyInfoDL may include frequencyBandList indicating a list of one or more frequency bands to which the downlink carriers belong and a list of SCS-SpecificCarrier indicating a set of parameters related to the carriers per subcarrier spacing. The parameter frequencyInfoUL may include a frequencyBandList indicating a list of one or more frequency bands to which the uplink carriers belong and a list of SCS-SpecificCarrier indicating a set of parameters related to the carriers per subcarrier spacing.

The parameter SCS-SpecificCarrier may include parameters indicating actual locations and bandwidths of the carriers and the bandwidths of the carriers. To be more specific, the information element SCS-SpecificCarrier in frequencyInfoDl, indicates a configuration for a specific carrier and includes subcarrierSpacing, carrierbandwidth and/or offsetToCarrier. The parameter subcarrierSpacing is a parameter indicating the subcarrier spacing of the carrier (for example, indicating 15 kHz or 30 kHz in FR1, and indicating 60 KHz or 120 KHz in FR2). The parameter carrierbandwidth is a parameter indicating the bandwidth of the carrier by the number of Physical Resource Blocks (PRBs). The parameter offsetToCarrier is a parameter indicating an offset in the frequency domain between the reference point A (the lowest subcarrier of a common RBO) and the lowest usable subcarrier of the carrier in number of PRBs (where the subcarrier spacing is a subcarrier spacing of the carrier given in subcarrierSpacing). For example, for a downlink carrier, a bandwidth of the downlink carrier is given by a higher layer parameter carrierbandwidth in SCS-SpecificCarrier in frequencyInfoDL per subcarrier spacing, and a start position on a frequency of the downlink carrier is given by the parameter offsetToCarrier in SCS-SpecificCarrier in frequencyInfoDL per subcarrier spacing. For example, for an uplink carrier, a bandwidth of the uplink carrier is given by a higher layer parameter carrierbandwidth in SCS-SpecificCarrier in frequencyInfoUL per subcarrier spacing, and a start position on a frequency of the uplink carrier is given by the parameter offsetToCarrier in SCS-SpecificCarrier in frequencyInfoUL per subcarrier spacing.

The parameter allocationBandwidth is information indicating the maximum allocation bandwidth of the downlink and/or the uplink to be supported by the terminal apparatus 1 in the corresponding cell. The information indicating the maximum allocation bandwidth may be information for specifying the bandwidth by the number of resource blocks. However, the information indicating the maximum allocation bandwidth may be configure for each subcarrier spacing. The information indicating the maximum allocation bandwidth may be indicated by an information element including a parameter subcarrierSpacing indicating a subcarrier spacing and a parameter allocationBandwidth indicating the number of resource blocks in the bandwidth. The maximum allocation bandwidth may be a maximum bandwidth supported by the RF circuit included in the terminal apparatus 1. The maximum bandwidth may be a maximum bandwidth in which signals/channels transmitted in downlink and/or uplink may be scheduled at the same time. In a case that a signal/channel is discretely scheduled on a frequency in downlink and/or uplink, the maximum allocation bandwidth may be a bandwidth of a frequency resource to which the signal/channel can be discretely mapped/allocated at a certain time.

The parameter allocationBandwidth may be a parameter included in the information elements of SCS-SpecificCarrier. The information indicating the maximum allocation bandwidth indicated by allocationBandwidth may be the number of resource blocks corresponding to the subcarrier spacing indicated by the information element subcarrierSpacing of SCS-SpecificCarrier including the parameter. The information indicating the maximum allocation bandwidth may be information for specifying the maximum allocation bandwidth by a ratio value with respect to the carrier-bandwidth notified by SCS-SpecificCarrier.

The parameter allocation Bandwidth may be a parameter included in the information elements of the BWP. The information indicating the maximum allocation bandwidth indicated by allocationBandwidth may be the number of resource blocks corresponding to the subcarrier spacing indicated by the information element subcarrierSpacing of the BWP including the parameter. The information indicating the maximum allocation bandwidth may be information for specifying the maximum allocation bandwidth by a ratio value to the bandwidth of the BWP indicated by location AndBandwidth included in the information elements of the corresponding BWP. The parameter allocationBandwidth may be a parameter configured per BWP.

In the parameter allocationBandwidth, information indicating the maximum allocation bandwidth of the downlink and information indicating the maximum allocation bandwidth of the uplink in a cell may be configured as a common parameter or may be configured as individual parameters (for example, which may be referred to as dlAllocationBandwidth and ulAllocationBandwidth, respectively).

In a case that initialDownlinkBWP is not provided in the SIB1 (which may be another SIB or an RRC parameter) received by the terminal apparatus 1, the initial downlink BWP may be defined by the position and the number of continuous PRBs starting from a PRB (physical resource block) having the lowest index and ending with a PRB having the highest index among the PRBs of the CORESET for Type0-PDCCH CSS Set (such as CORESET 0), and the SubCarrier Spacing (SCS) and the cyclic prefix of the PDCCH received in the CORESET for Type0-PDCCH CSS Set. In a case that the parameter initialDownlinkBWP is provided in the SIB1 received by the terminal apparatus 1, the initial downlink BWP may be indicated by initialDownlinkBWP.

The initial uplink BWP may be configured by use of a parameter provided in the MIB, a parameter provided in the SIB1, a parameter provided in the SIB, and/or an RRC parameter. For example, the initial uplink BWP may be configured by use of a parameter initialUplinkBWP provided in the SIB1. However, initialUplinkBWP is a parameter indicating a UE-specific, dedicated) configuration of the initial uplink BWP.

The initial uplink BWP may be defined/configured in initialUplinkBWP provided in the SIB1 (which may be the REDCAP SIB1, another SIB, or an RRC parameter). The terminal apparatus 1 may determine the initial uplink BWP based on initialUplinkBWP provided by the received SIB1.

The terminal apparatus 1 includes an RF circuit between an antenna included in the terminal apparatus 1 itself and a signal processing unit processing a baseband signal. The RF circuit mainly includes a signal processing unit, a power amplifier, an antenna switch, a filter, and the like. The signal processing unit of the RF circuit, in a case of receiving signals, performs processing of demodulating the RF signal received via the filter to output the received signal to the signal processing unit. The high frequency signal processing unit of the RF circuit, in a case of transmitting signals, performs processing of modulating a carrier signal to generate an RF signal, amplifying power by the power amplifier, and then outputting the RF signal to the antenna. The antenna switch connects the antenna and the filter in a case of receiving signals, and connects the antenna and the power amplifier in a case of transmitting signals.

In a case that the bandwidth of the configured initial downlink BWP is wider than the bandwidth supported by the RF circuit included in the terminal apparatus 1 (which may be referred to as an allocation bandwidth), the terminal apparatus 1 may tunc/retune the frequency band applied to the RF circuit in the initial downlink BWP. Tuning/retuning the frequency band applied to the RF circuit may be referred to as RF tuning/RF retuning. FIG. 6 is a diagram illustrating an example of the RF retuning. In FIG. 6, in a case that the applied band of the RF circuit used in the terminal apparatus 1 is outside the band of the downlink channel received in the initial downlink BWP, the terminal apparatus 1 performs RF retuning so that the applied band of the RF circuit includes the band of the downlink channel to be received. In a case that the bandwidth of the configured initial uplink BWP is wider than the bandwidth supported by the RF circuit included in the terminal apparatus 1 (which may be referred to as an allocation bandwidth), the terminal apparatus 1 may tune/retune the frequency band applied to the RF circuit in the initial uplink BWP. In a case that the bandwidth of the configured downlink BWP is wider than the bandwidth supported by the RF circuit included in the terminal apparatus 1 (which may be referred to as an allocation bandwidth), the terminal apparatus 1 may tune/retune the frequency band applied to the RF circuit in the downlink BWP. In a case that the bandwidth of the configured initial uplink BWP is wider than the bandwidth supported by the RF circuit included in the terminal apparatus 1 (which may be referred to as an allocation bandwidth), the terminal apparatus 1 may tune/retune the frequency band applied to the RF circuit in the uplink BWP.

The terminal apparatus 1 may be configured with multiple initial downlink sub-BWPs by use of the SIB1. At least one of the multiple initial downlink sub-BWPs may be configured to include an SS/PBCH block. The terminal apparatus 1 may operate considering the initial downlink sub-BWP including the SS/PBCH block (cell-defining SS/PBCH block (cell-defining SSB) or the like) as the initial downlink BWP. At least one of the multiple initial downlink sub-BWPs may be configured to include the CORESET 0. All of the multiple initial downlink sub-BWPs may be configured to include the respective CORESET 0. The terminal apparatus 1 may operate considering the initial downlink sub-BWP including the CORESET 0 as the initial downlink BWP. The terminal apparatus 1 may operate considering the initial downlink sub-BWP as the initial downlink BWP. The multiple initial downlink sub-BWPs may be considered as multiple initial downlink BWPs. The multiple initial downlink sub-BWPs may be designed to be included in a frequency band of one initial downlink BWP. The initial downlink sub-BWP may also be interpreted as a downlink BWP or a downlink sub-BWP. However, "multiple initial downlink BWPs being configured" for the terminal apparatus 1 may mean that multiple frequency locations and/or multiple bandwidths of the initial downlink BWP are configured. The base station apparatus 3 may broadcast information including a configuration of the multiple frequency locations and/or multiple bandwidths of the initial downlink BWP, and the terminal apparatus 1 may determine/specify/configure the frequency location and bandwidth of the initial downlink BWP based on the information.

The terminal apparatus 1 according to an aspect of the present invention receives/specifies configuration information of the initial downlink BWP in the higher layer parameter initialDownlinkBWP. However, the parameter initialDownlinkBWP may be included in the SIB1 or may be included in any RRC message. For example, the configuration information of the initial downlink BWP may include information indicating the frequency location and bandwidth of the initial downlink BWP. The terminal apparatus 1 may receive the SIB1 or any RRC message including multiple pieces of the configuration information of the initial downlink BWP. Multiple pieces of the configuration information of the initial downlink BWP may be included in one parameter initialDownlinkBWP.

FIG. 7 illustrates an example of a parameter configuration of an information element (IE) BWP-DownlinkCommon of initialDownlinkBWP according to the present embodiment. The parameter initialDownlinkBWP according to the present embodiment may include a generic parameter genericParameters for the initial downlink BWP, a cell-specific parameter pdcch-ConfigCommon for the PDCCH, a cell-specific parameter pdsch-ConfigCommon for the PDSCH, and/or a parameter indicating second configuration information of the initial downlink BWP. However, the parameter indicating the second configuration information of the initial downlink BWP may be a parameter locationAndBandwidth-re in initialDownlinkBWP indicating a second "frequency location and bandwidth" of the initial downlink BWP. In a case that the multiple initial downlink BWPs are configured in a cell (or in a case that the configuration information of multiple frequency locations and/or multiple bandwidths of the initial downlink BWP is broadcast in a cell), a part of the information included in genericParameters in initialDownlinkBWP may be a parameter common to the multiple initial downlink BWPs (or the configuration information of multiple frequency locations and/or multiple bandwidths of the initial downlink BWP).

The parameter genericParameters included in initialDownlinkBWP includes information elements (IEs) BWP, including the parameter locationAndBandwidth indicating the frequency location and bandwidth of the initial downlink BWP, the parameter subcarrierSpacing indicating the subcarrier spacing used for all channels and reference signals in the initial downlink BWP, and the parameter cyclicPrefix indicating whether an extended cyclic prefix (CP) is used in the initial downlink BWP. However, in a case that the multiple "frequency locations and/or bandwidths" of the initial downlink BWP are configured in a cell, locationAndBandwidth included in genericParameters in initialDownlinkBWP may be a parameter indicating a first "frequency location and bandwidth" of the initial downlink BWP. However, in the case that the multiple "frequency locations and/or bandwidths" of the initial downlink BWP are configured in a cell, subcarrierSpacing included in genericParameters in initialDownlinkBWP may be a parameter indicating the subcarrier spacing used for all channels and reference signals in the initial downlink BWP configured in the first "frequency location and bandwidth" or may be a parameter indicating the subcarrier spacing used for all channels and reference signals common to the initial downlink BWPs configured in different "frequency locations and bandwidths". For example, the terminal apparatus 1 may determine/specify the subcarrier spacing used for all channels (for example, the PDCCH and the PDSCH) and reference signals in the initial downlink BWP based on subcarrierSpacing included in genericParameters in initialDownlinkBWP regardless of whether or not initialDownlinkBWP includes configuration information of the second "frequency location and bandwidth" (location And-Bandwidth-rc). However, in the case that the multiple "frequency locations and/or bandwidths" of the initial downlink BWP are configured in a cell, cyclicPrefix included in genericParameters in initialDownlinkBWP may be a parameter indicating whether the extended cyclic prefix (CP) is used in the initial downlink BWP configured in the first "frequency location and bandwidth" or may be a parameter indicating whether the extended CP is used in common in the initial downlink BWP configured in different "frequency locations and bandwidths". For example, the terminal apparatus 1 may determine/specify whether or not the extended CP is used in the initial downlink BWP based on cyclicPrefix included in genericParameters in initialDownlinkBWP regardless of whether or not initialDownlinkBWP includes the configuration information of the second "frequency location and bandwidth" (locationAndBandwidth-rc).

A value indicated by locationAndBandwidth included in genericParameters in initial DownlinkBWP is interpreted as a Resource Indicator Value (RIV). The RIV is an index indicating a start position of the resource block and the number of continuous resource blocks, and the frequency location and bandwidth of the initial downlink BWP may be specified according to the value of the index. The subcarrier spacing of the initial downlink BWP indicated by subcarrierSpacing included in genericParameters in initialDownlinkBWP may be configured to be the same value as the subcarrier spacing indicated by the MIB of the same cell. In a case that cyclicPrefix is not included (not set) in genericParameters, the terminal apparatus 1 may use the standard CP without using the extended CP.

However, different parameters indicating different frequency locations and/or bandwidths for the initial downlink BWP (locationAndBandwidth and locationAndBandwidth-rc in initialDownlinkBWP) may be information for configuring the initial downlink BWPs different in the frequency locations and/or bandwidths. However, different parameters indicating different frequency locations and/or bandwidths for the initial downlink BWP (location AndBandwidth and location AndBandwidth-rc in initialDownlinkBWP) may be information indicating different frequency locations and bandwidths of the initial downlink BWPs. For example, the terminal apparatus 1 not supporting the RedCap may specify/determine the frequency location and bandwidth of the initial downlink BWP by use of locationAndBandwidth in initialDownlinkBWP, and the terminal apparatus 1 supporting the RedCap may specify/determine the frequency location and bandwidth of the initial downlink BWP by use of location AndBandwidth-re in a case that locationAndBandwidth-re is included in initialDownlinkBWP, and may specify/determine the frequency location and bandwidth of the initial downlink BWP by use of locationAndBandwidth in initialDownlinkBWP in a case that location AndBandwidth-rc is not included in initialDownlinkBWP.

However, in the present embodiment, the parameter locationAndBandwidth-rc indicating the second "frequency location and bandwidth" of the initial downlink BWP can be configured to be not included in genericParameters in initialDownlinkBWP, that is an initial downlink generic parameter, to be handled as an additional parameter to the generic parameter, or may be configured to be included in genericParameters in initialDownlinkBWP.

The parameter pdcch-ConfigCommon included in initialDownlinkBWP may include a parameter controlResourceSetZero of the CORESET 0 used in a common search space or a UE-specific search space, a parameter commonControlResourceSet of an additional common CORESET used in a common search space or a UE-specific search space, a parameter searchSpaceZero of a common search space 0 (common search space #0), a parameter commonSearchSpaceList indicating a list of common search spaces other than the common search space 0, a parameter searchSpaceSIB1 indicating an ID of a search space for an SIB1 messages, a parameter searchSpaceOtherSystemInformation indicating an ID of a search space for other system information, a parameter pagingSearchSpace indicating an ID of a search space for paging, and/or a parameter raSearchSpace indicating an ID of a search space for a random access procedure.

Any value from 0 to 15 is set for an Information Element (IE) ControlResourceSetZero indicated by controlResourceSetZero. However, the number of values that can be set for ControlResourceSetZero may be other than 16, and may be 32, for example. Any one of values 0 to 15 is set for an information element SearchSpaceZero indicated by searchSpaceZero. However, the number of values that can be set for SearchSpaceZero may be other than 16, and may be 32, for example.

The terminal apparatus 1 determines the number of continuous resource blocks and the number of continuous symbols for the CORESET 0 from controlResourceSetZero in pdcch-ConfigCommon. However, the value indicated by controlResourceSetZero is applied to a prescribed table as an index. However, the terminal apparatus 1 may determine the table for the application based on the supported UE category and/or UE Capability. However, the terminal apparatus 1 may determine the table for the application based on the minimum channel bandwidth. However, the terminal apparatus 1 may determine the table for the application based on the subcarrier spacing of the SS/PBCH block and/or the subcarrier spacing of the CORESET 0. Each row of the table to which the value of controlResourceSetZero is applied as an index may indicate the index indicated by controlResourceSetZero, a multiplexing pattern of the PBCH and the CORESET, the number of RBs (which may be PRBs) of the CORESET 0, the number of symbols of the CORESET 0, the offset and/or the number of PDCCH repetitions.

The multiplexing pattern of the PBCH and the CORESET indicates a pattern of a relationship between the SS/PBCH block corresponding to the PBCH in which the MIB is detected and the frequency/time location of the corresponding CORESET 0. For example, in a case that the multiplexing pattern of the PBCH and the CORESET is 1, the PBCH and the CORESET are time-multiplexed on different symbols.

The number of RBs of the CORESET 0 indicates the number of resource blocks continuously allocated to the CORESET 0. The number of symbols of the CORESET (indicates the number of symbols continuously allocated to the CORESET 0.

The offset indicates an offset from the lowest RB index of the resource block allocated to the CORESET 0 to the lowest RB index of the common resource block overlapped by the first resource block of the corresponding REDCAP PBCH. However, the offset may indicate an offset from the lowest RB index of the resource block allocated to the CORESET 0 to the lowest RB index of the common resource block overlapped by the first resource block of the corresponding SS/PBCH blocks.

The terminal apparatus 1 receives initialDownlinkBWP including the RRC parameter pdcch-ConfigCommon by way of the SIB1 or the RRC message and monitors the PDCCH based on the parameter.

The terminal apparatus 1 determines a PDCCH monitoring occasion from searchSpaceZero in pdech-ConfigCommon. However, a value indicated by the searchSpaceZero is applied to a prescribed table as an index. However, the terminal apparatus 1 may determine the table for the application based on the supported UE category and/or UE Capability. However, the terminal apparatus 1 may determine the table for the application based on the frequency range. The terminal apparatus 1 monitors the PDCCH in a Type0-PDCCH common search space set (Type0-PDCCH CSS Set) over two continuous slots from a slot no. In the SS/PBCH block having an index of i, the terminal apparatus 1 determines n0 and the system frame number based on a parameter O and a parameter M indicated in the table.

In a case that the parameter indicating multiple "frequency locations and bandwidths" for the initial downlink BWP (location AndBandwidth and locationAndBandwidth-re in initialDownlinkBWP) are configured in a cell (or in a case that multiple initial downlink BWPs are configured in a cell), pdcch-ConfigCommon included in initialDownlinkBWP or each parameter of pdcch-ConfigCommon may be a cell-specific parameter for a PDCCH in the initial downlink BWP configured in the first "frequency location and bandwidth" or a cell-specific parameter for a PDCCH common to the initial downlink BWPs configured in different "frequency locations and bandwidths". For example, the terminal apparatus 1 may determine/specify the cell-specific parameter for the PDCCH in the initial downlink BWP based on pdcch-ConfigCommon included in initialDownlinkBWP or some parameters of pdcch-ConfigCommon regardless of whether or not initialDownlinkBWP includes the configuration information of the second "frequency location and bandwidth" (location AndBandwidth-rc). The parameter pdsch-ConfigCommon included in initialDownlinkBWP may include a parameter pdsch-TimeDomainAllocationList indicating a list of time domain configurations for the timing of downlink assignments for the downlink data.

In a case that the parameter indicating multiple "frequency locations and bandwidths" for the initial downlink BWP (location AndBandwidth and locationAndBandwidth-rc in initialDownlinkBWP) are configured in a cell (or in a case that multiple initial downlink BWPs are configured in a cell), pdsch-ConfigCommon included in initialDownlinkBWP or each parameter of pdsch-ConfigCommon may be a cell-specific parameter for a PDSCH in the initial downlink BWP configured in the first "frequency location and bandwidth" or a cell-specific parameter for a PDSCH common to the initial downlink BWPs configured in different "frequency locations and bandwidths". For example, the terminal apparatus 1 may determine/specify the cell-specific parameter for the PDSCH in the initial downlink BWP based on pdsch-ConfigCommon included in initialDownlinkBWP or some parameters of pdsch-ConfigCommon regardless of whether or not initialDownlinkBWP includes the configuration information of the second "frequency location and bandwidth" (location AndBandwidth-rc).

A value indicated by locationAndBandwidth-rc included in initialDownlinkBWP is interpreted as a Resource Indicator Value (RIV). The RIV is an index indicating a start position of the resource block and the number of continuous resource blocks, and the frequency location and bandwidth of the initial downlink BWP may be specified according to the value of the index.

In a case that locationAndBandwidth-rc is not included in initialDownlinkBWP, the terminal apparatus 1 may specify/determine the frequency location and bandwidth of the initial downlink BWP based on locationAndBandwidth included in genericParameters in initialDownlinkBWP. In a case that location AndBandwidth-rc is included in initialDownlinkBWP, the terminal apparatus 1 may specify/determine the frequency location and bandwidth of the initial downlink BWP based on location AndBandwidth-rc.

The terminal apparatus 1 not supporting the frequency location and/or the bandwidth of the first initial downlink BWP may specify/determine a second initial downlink BWP from location AndBandwidth-re included in initialDownlinkBWP to receive the downlink channel and the downlink signal transmitted from the base station apparatus 3.

In a case that the base station apparatus 3 configures the initial downlink BWP of the frequency location and/or the bandwidth that is not supported by a specific terminal apparatus 1 by use of locationAndBandwidth, the base station apparatus 3 can configure the initial downlink BWP of the frequency location and/or the bandwidth supported by the terminal apparatus 1 by use of location AndBandwidth-rc to appropriately transmit the downlink channel and the downlink signal. The base station apparatus 3 can include locationAndBandwidth-re in initialDownlinkBWP to transmit the downlink channel and the reference signal corresponding to the second initial downlink BWP to the terminal apparatus 1 not supporting the frequency location and/or the bandwidth of the first initial downlink BWP, and transmit the downlink channel and the reference signal corresponding to the first initial downlink BWP to the terminal apparatus 1 supporting the frequency location and the bandwidth of the first initial downlink BWP. In a case that the base station apparatus 3 configures the initial downlink BWP of the frequency locations and/or the bandwidths supported by all the terminal apparatuses 1 by use of location AndBandwidth in initialDownlinkBWP, the base station apparatus 3 may not include location AndBandwidth-rc in initialDownlinkBWP.

The terminal apparatus 1 may determine/specify the subcarrier spacing used for all channels and reference signals in the initial downlink BWP using subcarrierSpacing included in genericParameters in initialDownlinkBWP regardless of whether or not locationAndBandwidth-rc is included in initialDownlinkBWP. The terminal apparatus 1 may determine/specify whether or not the extended cyclic prefix CP is used in the initial downlink BWP using cyclicPrefix included in genericParameters in initialDownlinkBWP regardless of whether or not location AndBandwidth-rc is included in initialDownlinkBWP.

The terminal apparatus 1 may specify/determine a cell-specific parameter for the PDCCH in the initial downlink BWP and monitor/receive the PDCCH using pdcch-ConfigCommon included in initialDownlinkBWP regardless of whether or not locationAndBandwidth-re is included in initialDownlinkBWP. The terminal apparatus 1 may specify/determine a cell-specific parameter for the PDSCH in the initial downlink BWP and monitor/receive the PDSCH using pdsch-ConfigCommon included in initialDownlinkBWP regardless of whether or not location AndBandwidth-rc is included in initialDownlinkBWP.

Figure 8:
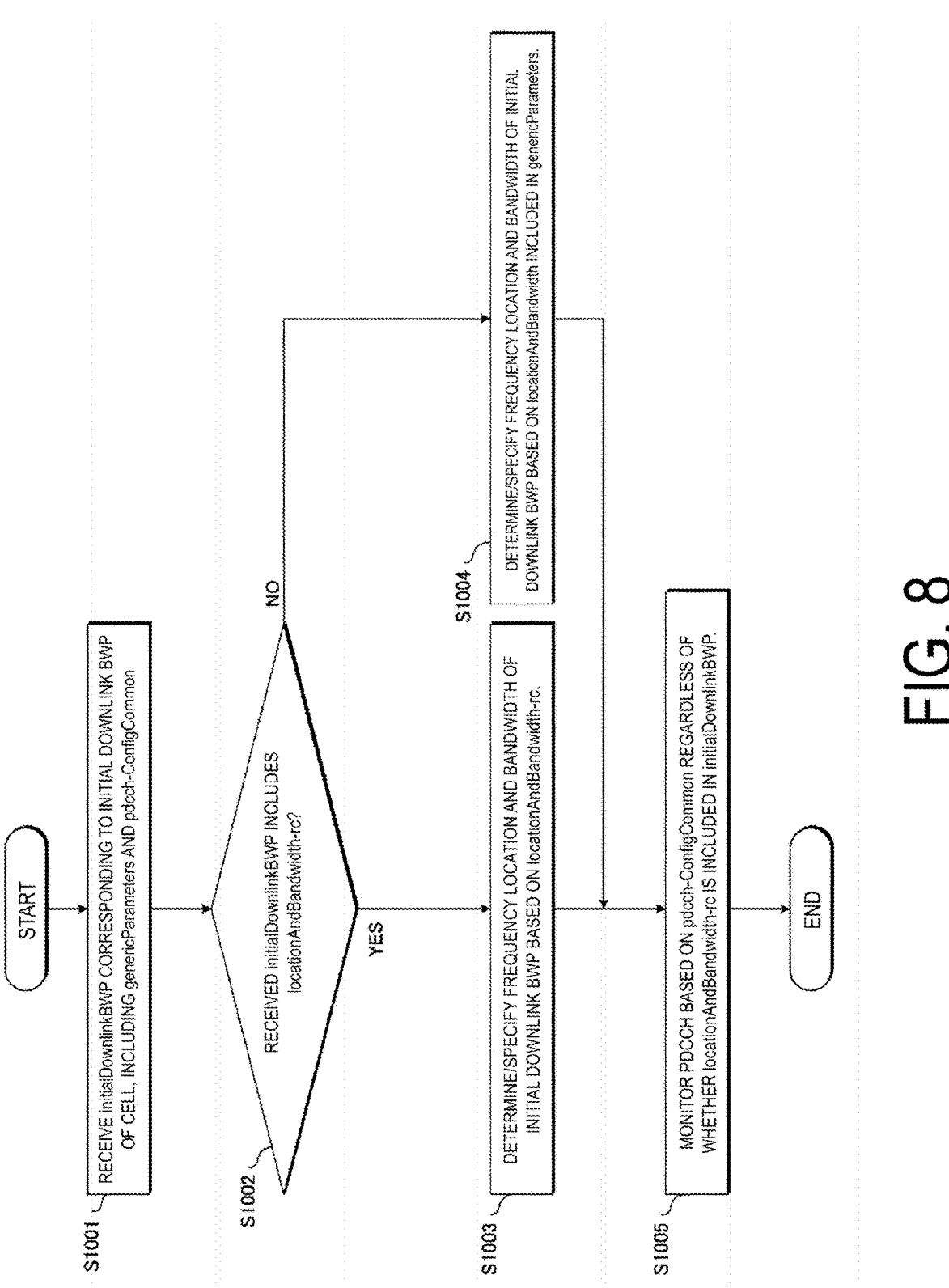
FIG. 8 is a flowchart illustrating an example of processing related to initial downlink BWP determination and PDCCH monitoring in a terminal apparatus 1 according to an embodiment of the present invention.

FIG. 8 is a flowchart illustrating an example of processing related to initial downlink BWP determination and PDCCH monitoring in the terminal apparatus 1 according to the present embodiment. In step S1001 of FIG. 8, the terminal apparatus 1 receives a common parameter (information) initialDownlinkBWP of the initial downlink BWP in a cell including the parameter (information) genericParameters indicating the generic parameter for the initial downlink BWP and the parameter (information) pdcch-ConfigCommon indicating the cell-common parameter for the physical downlink control channel of the initial downlink BWP. In step S1002, the terminal apparatus 1 determines whether the received initialDownlinkBWP includes the parameter (information) locationAndBandwidth-rc indicating the second frequency location and bandwidth of the initial downlink BWP. In a case that the determination is positive (S1002—Yes), in step S1003, the terminal apparatus 1 determines/specifies the frequency location and bandwidth of the initial downlink BWP based on location AndBandwidth-rc in initialDownlinkBWP. In a case that the determination is negative in step S1002 (S1002—No), in step S1004, the terminal apparatus 1 determines/specifies the frequency location and bandwidth of the initial downlink BWP based on the parameter (information) location AndBandwidth indicating the first frequency location and bandwidth of the initial downlink BWP included in genericParameters in initialDownlinkBWP. In step S1005, the terminal apparatus 1 monitors the PDCCH based on pdcch-ConfigCommon regardless of whether or not locationAndBandwidth-rc is included in initialDownlinkBWP.

Sharing and using the parameters related to the BWP for multiple initial downlink BWPs in this way can reduce the overhead of the SIB1.

The terminal apparatus 1 may be configured with multiple initial uplink sub-BWPs by use of the SIB1. The terminal apparatus 1 may determine one or more initial uplink sub-BWPs based on initialUplinkBWP provided by the SIB1. At least one of the multiple initial uplink sub-BWPs may be configured to include a resource of a physical random access channel. The terminal apparatus 1 may operate considering the initial uplink sub-BWP as the initial uplink BWP. The multiple initial uplink sub-BWPs may be considered as multiple initial uplink BWPs. The multiple initial uplink sub-BWPs may be designed to be included in a frequency band of one initial uplink BWP. The initial uplink sub-BWP may also be interpreted as an uplink BWP or an uplink sub-BWP. However, "multiple initial uplink BWPs being configured" for the terminal apparatus 1 may mean that multiple frequency locations and/or multiple bandwidths of the initial uplink BWP are configured. The base station apparatus 3 may broadcast information including a configuration of the multiple frequency locations and/or multiple bandwidths of the initial uplink BWP, and the terminal apparatus 1 may determine/specify/configure the frequency location and bandwidth of the initial uplink BWP based on the information.

The SIB1 may include a common downlink configuration parameter uplinkConfigCommon of a cell. At least one of the parameters for the terminal apparatus 1 in a cell to determine whether or not the cell is barred may be included in uplinkConfigCommon indicating the common uplink parameter of the cell. The parameter uplinkConfigCommon may include a parameter indicating a basic parameter related to one uplink carrier and transmission (e.g., referred to as frequencyInfoUL), a parameter indicating an initial uplink BWP configuration of a serving cell (e.g., referred to as initialUplinkBWP), and/or a parameter indicating a configuration of multiple initial uplink sub-BWPs (e.g., referred to as initialUplinkBWP-rc). Information ulAllocationBandwidth indicating the maximum allocation bandwidth in the uplink may be included in uplinkConfigCommon.

The parameter initialUplinkBWP includes information elements of the BWP, information elements of the PDCCH configuration, and/or information elements of the PDSCH configuration. However, the initial uplink BWP may be configured by the network to include a physical random access channel resource in the frequency domain.

The terminal apparatus 1 according to an aspect of the present invention receives/specifies configuration information of the initial uplink BWP in the higher layer parameter initialUplinkBWP. However, the parameter initialUplinkBWP may be included in the SIB1 or may be included in any RRC message. For example, the configuration information of the initial uplink BWP may include information indicating the frequency location and bandwidth of the initial uplink BWP. The terminal apparatus 1 may receive the SIB1 or any RRC message including multiple pieces of the configuration information of the initial uplink BWP. Multiple pieces of the configuration information of the initial uplink BWP may be included in one parameter initialUplinkBWP.

FIG. 9 illustrates an example of a parameter configuration of an information element (IE) BWP-UplinkCommon of initialUplinkBWP according to the present embodiment. The parameter initialUplinkBWP according to the present embodiment may include a generic parameter genericParameters for the initial uplink BWP, a cell-specific parameter rach-ConfigCommon for a random access, a cell-specific parameter pusch-ConfigCommon for the PUSCH, a cell-specific parameter pucch-ConfigCommon for the PUCCH, and/or a parameter indicating second configuration information of the initial uplink BWP. However, the parameter indicating the second configuration information of the initial uplink BWP may be a parameter location AndBandwidth-rc indicating a second "frequency location and bandwidth" of the initial uplink BWP. In a case that the multiple initial uplink BWPs are configured in a cell (or in a case that the configuration information of multiple frequency locations and/or multiple bandwidths for the initial uplink BWP is broadcast in a cell), a part of the information included in genericParameters may be a parameter common to the multiple initial uplink BWPs (or the configuration information of multiple frequency locations and/or multiple bandwidths of the initial uplink BWP).

The parameter genericParameters included in initialUplinkBWP includes information elements (IEs) BWP, including the parameter locationAndBandwidth indicating the frequency location and bandwidth of the initial uplink BWP, the parameter subcarrierSpacing indicating the subcarrier spacing used for all channels and reference signals in the initial uplink BWP, and the parameter cyclicPrefix indicating whether an extended cyclic prefix (CP) is used in the initial uplink BWP. However, in a case that the multiple "frequency locations and/or bandwidths" of the initial uplink BWP are configured in a cell, location AndBandwidth included in genericParameters may be a parameter indicating a first "frequency location and bandwidth" of the initial uplink BWP. However, in the case that the multiple "frequency locations and/or bandwidths" of the initial uplink BWP are configured in a cell, subcarrierSpacing included in genericParameters may be a parameter indicating the subcarrier spacing used for all channels and reference signals in the initial uplink BWP configured in the first "frequency location and bandwidth" or may be a parameter indicating the subcarrier spacing used for all channels and reference signals common to the initial uplink BWPs configured in different "frequency locations and bandwidths". For example, the terminal apparatus 1 may determine/specify the subcarrier spacing used for all channels (for example, the PUCCH, the PUSCH, and the PRACH) and reference signals in the initial uplink BWP based on subcarrierSpacing included in genericParameters in initialUplinkBWP regardless of whether or not initialUplinkBWP includes configuration information of the second "frequency location and bandwidth" (location AndBandwidth-rc). However, in the case that the multiple "frequency locations and/or bandwidths" of the initial uplink BWP are configured in a cell, cyclicPrefix included in genericParameters in initialUplinkBWP may be a parameter indicating whether the extended cyclic prefix (CP) is used in the initial uplink BWP configured in the first "frequency location and bandwidth" or may be a parameter indicating whether the extended CP is used in common in the initial uplink BWP configured in different "frequency locations and bandwidths". For example, the terminal apparatus 1 may determine/specify whether or not the extended CP is used in the initial uplink BWP based on cyclicPrefix included in genericParameters in initialUplinkBWP regardless of whether or not initialUplinkBWP includes the configuration information of the second "frequency location and bandwidth" (location AndBandwidth-rc).

A value indicated by locationAndBandwidth included in genericParameters in initialUplinkBWP is interpreted as a Resource Indicator Value (RIV). The RIV is an index indicating a start position of the resource block and the number of continuous resource blocks, and the frequency location and bandwidth of the initial uplink BWP may be specified according to the value of the index. The subcarrier spacing of the initial uplink BWP indicated by subcarrier- Spacing included in genericParameters in initialUplinkBWP may be configured to be the same value as the subcarrier spacing indicated by the MIB of the same cell. In a case that cyclicPrefix is not included (not set) in genericParameters in initialUplinkBWP, the terminal apparatus 1 may use the standard CP without using the extended CP.

However, different parameters indicating different frequency locations and/or bandwidths for the initial uplink BWP (locationAndBandwidth and location AndBandwidth-re in initialUplinkBWP) may be information for configuring the initial uplink BWPs different in the frequency locations and/or bandwidths. For example, the initial uplink BWP configured by use of location AndBandwidth may be the initial uplink BWP used in the terminal apparatus 1 not supporting the RedCap, and the initial uplink BWP configured by use of location AndBandwidth-re may be the initial uplink BWP used in the terminal apparatus 1 supporting the RedCap. However, different parameters indicating different frequency locations and/or bandwidths for the initial uplink BWP (locationAndBandwidth and location AndBandwidth-re in initialUplinkBWP) may be information indicating different frequency locations and bandwidths for the initial uplink BWPs. For example, the terminal apparatus 1 not supporting the RedCap may specify/determine the frequency location and bandwidth of the initial uplink BWP by use of location AndBandwidth in initialUplinkBWP, and the terminal apparatus 1 supporting the RedCap may specify/determine the frequency location and bandwidth of the initial uplink BWP by use of location AndBandwidth-re in a case that locationAndBandwidth-re is included in initialUplinkBWP, and may specify/determine the frequency location and bandwidth of the initial uplink BWP by use of locationAndBandwidth in initialUplinkBWP in a case that location AndBandwidth-re is not included in initialUplinkBWP.

However, in the present embodiment, the parameter locationAndBandwidth-re in initialUplinkBWP indicating the second "frequency location and bandwidth" of the initial uplink BWP can be configured to be not included in genericParameters, that is an initial uplink generic parameter, to be handled as an additional parameter to the generic parameter, or may be configured to be included in genericParameters in initialUplinkBWP.

The parameter pucch-ConfigCommon included in initialUplinkBWP may include a parameter pucch-Resource-Common indicating an index configuring a set of cell-specific PUCCH resources/parameters, a parameter pucch-GroupHopping indicating a configuration of group hopping and sequence hopping in PUCCH formats 0, 1, 3, 4, a parameter hoppingId indicating a cell-specific scrambling ID in the group hopping and the sequence hopping, and/or a parameter p0-nominal indicating a power control parameter (P0) for PUCCH transmission.

In a case that the parameter indicating multiple "frequency locations and bandwidths" for the initial uplink BWP (location AndBandwidth and locationAndBandwidth-rc) are configured in a cell (or in a case that multiple initial uplink BWPs are configured in a cell), pucch-ConfigCommon included in initialUplinkBWP or each parameter of pucch-ConfigCommon may be a cell-specific parameter for a PDCCH in the initial uplink BWP configured in the first "frequency location and bandwidth" or a cell-specific parameter for a PUCCH common to the initial uplink BWPs configured in different "frequency locations and bandwidths". For example, the terminal apparatus 1 may determine/specify the cell-specific parameter for the PUCCH in the initial uplink BWP based on pucch-ConfigCommon included in initialUplinkBWP or some parameters of pucch-ConfigCommon regardless of whether or not initialUplinkBWP includes the configuration information of the second "frequency location and bandwidth" (location And-Bandwidth-rc).

The parameter pusch-ConfigCommon included in the initialUplinkBWP may include a parameter pusch-TimeDomainAllocationList indicating a list of time domain configurations for the timing of uplink assignments for uplink data, a cell-specific parameter group HoppingEnabledTransform-Precoding indicating whether group hopping of DMRS is enabled, a parameter msg3-DeltaPreamble indicating a power offset between msg3 and RACH preamble transmission, and/or a parameter p0-NominalWithGrant indicating a value of a target received power P0 of a PUSCH with a grant.

In the case that the parameter indicating multiple "frequency locations and bandwidths" for the initial uplink BWP (locationAndBandwidth and locationAndBandwidth-rc) are configured in a cell (or in a case that multiple initial uplink BWPs are configured in a cell), pusch-ConfigCommon included in initialUplinkBWP or each parameter of pusch-ConfigCommon may be a cell-specific parameter for a PUSCH in the initial uplink BWP configured in the first "frequency location and bandwidth" or a cell-specific parameter for a PUSCH common to the initial uplink BWPs configured in different "frequency locations and bandwidths". For example, the terminal apparatus 1 may determine/specify the cell-specific parameter for the PUSCH in the initial uplink BWP based on pusch-ConfigCommon included in initialUplinkBWP or some parameters of pusch-ConfigCommon regardless of whether or not initialUplinkBWP includes the configuration information of the second "frequency location and bandwidth" (location And-Bandwidth-rc).

A value indicated by locationAndBandwidth-rc included in initialUplinkBWP is interpreted as a Resource Indicator Value (RIV). The RIV is an index indicating a start position of the resource block and the number of continuous resource blocks, and the frequency location and bandwidth of the initial uplink BWP may be specified according to the value of the index.

In a case that locationAndBandwidth-rc is not included in initialUplinkBWP, the terminal apparatus 1 may specify/determine the frequency location and bandwidth of the initial uplink BWP based on locationAndBandwidth included in genericParameters in initialUplinkBWP. In a case that locationAndBandwidth-re is included in initialUplinkBWP, the terminal apparatus 1 may specify/determine the frequency location and bandwidth of the initial uplink BWP based on location AndBandwidth-rc.

The terminal apparatus 1 not supporting the first frequency location and/or the bandwidth of the initial uplink BWP may specify/determine a second initial uplink BWP from location AndBandwidth-re included in initialUplinkBWP to receive the uplink channel and the uplink signal transmitted from the base station apparatus 3.

In a case that the base station apparatus 3 configures the initial uplink BWP of the frequency location and/or the bandwidth that is not supported by a specific terminal apparatus 1 by use of locationAndBandwidth, the base station apparatus 3 can configure the initial uplink BWP of the frequency location and/or the bandwidth supported by the terminal apparatus 1 by use of locationAndBandwidth-re in initialUplinkBWP to appropriately transmit the uplink channel and the uplink signal. The base station apparatus 3 can include locationAndBandwidth-re in initialUplinkBWP to transmit the uplink channel and the reference signal corresponding to the second initial uplink BWP to the terminal apparatus 1 not supporting the frequency location and/or the bandwidth of the first initial uplink BWP, and transmit the uplink channel and the reference signal corresponding to the first initial uplink BWP to the terminal apparatus 1 supporting the frequency location and the bandwidth of the first initial uplink BWP. In a case that the base station apparatus 3 configures the initial uplink BWP of the frequency locations and/or the bandwidths supported by all the terminal apparatuses 1 by use of location AndBandwidth in initialUplinkBWP, the base station apparatus 3 may not include location AndBandwidth-rc in initialUplinkBWP.

The terminal apparatus 1 may determine/specify the subcarrier spacing used for all channels and reference signals in the initial uplink BWP using subcarrierSpacing included in genericParameters in initialUplinkBWP regardless of whether or not locationAndBandwidth-rc is included in initialUplinkBWP. The terminal apparatus 1 may determine/specify whether or not the extended cyclic prefix CP is used in the initial uplink BWP using cyclicPrefix included in genericParameters in initialUplinkBWP regardless of whether or not locationAndBandwidth-rc is included in initialUplinkBWP.

The terminal apparatus 1 may specify/determine a cell-specific parameter for the PUCCH in the initial uplink BWP and transmit the PUCCH using pucch-ConfigCommon included in initialUplinkBWP regardless of whether or not locationAndBandwidth-rc is included in initialUplinkBWP. The terminal apparatus 1 may specify/determine a cell-specific parameter for the PUSCH in the initial uplink BWP and transmit the PUSCH using pusch-ConfigCommon included in initialUplinkBWP regardless of whether or not locationAndBandwidth-re is included in initialUplinkBWP.

Figure 10:
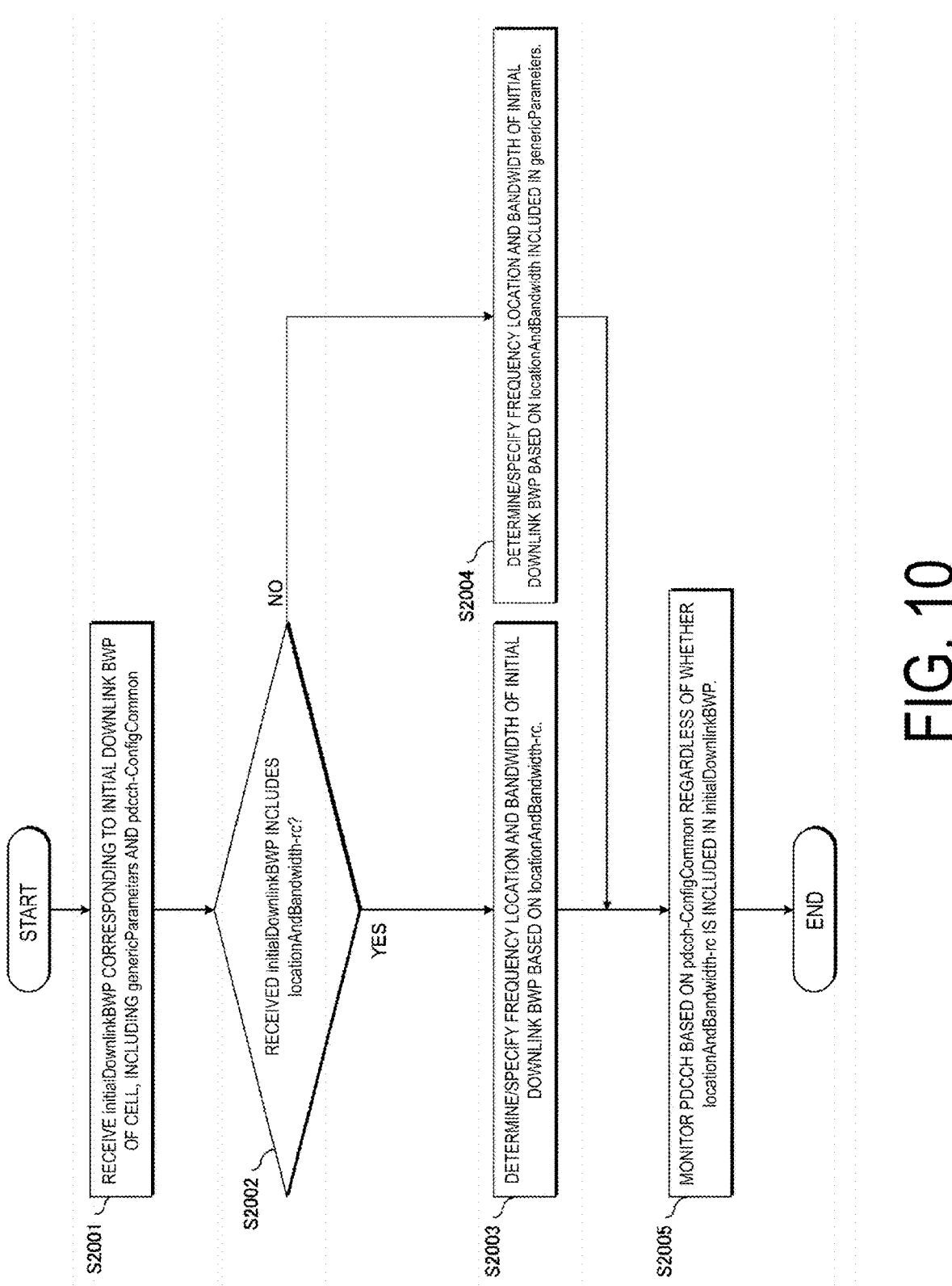
FIG. 10 is a flowchart illustrating an example of processing related to initial uplink BWP determination and PUSCH transmission in the terminal apparatus 1 according to an embodiment of the present invention.

FIG. 10 is a flowchart illustrating an example of processing related to initial uplink BWP determination and PUSCH transmission in the terminal apparatus 1 according to the present embodiment. In step S2001 of FIG. 10, the terminal apparatus 1 receives a common parameter (information) initialUplinkBWP of the initial uplink BWP in a cell including the parameter (information) genericParameters indicating the generic parameter for the initial uplink BWP and the parameter (information) pusch-ConfigCommon indicating the cell-common parameter for the physical uplink shared channel of the initial uplink BWP. In step S2002, the terminal apparatus 1 determines whether the received initialUplinkBWP includes the parameter (information) location AndBandwidth-rc indicating the second frequency location and bandwidth of the initial uplink BWP. In a case that the determination is positive (S2002—Yes), in step S2003, the terminal apparatus 1 determines/specifies the frequency location and bandwidth of the initial uplink BWP based on locationAndBandwidth-re in initialUplinkBWP. In a case that the determination is negative in step S2002 (S2002— No), in step S2004, the terminal apparatus 1 determines/specifies the frequency location and bandwidth of the initial uplink BWP based on the parameter (information) locationnAndBandwidth indicating the first frequency location and bandwidth of the initial uplink BWP included in genericParameters in initialUplinkBWP. In step S2005, the terminal apparatus 1 transmits the PUSCH based on pusch-ConfigCommon regardless of whether or not locationAndBandwidth-re is included in initialUplinkBWP.

Sharing and using the parameters related to the BWP for multiple initial uplink BWPs in this way can reduce the overhead of the SIB1 or RRC message.

However, the sub-BWP (which may include an uplink sub-BWP, a downlink sub-BWP, an initial uplink sub-BWP, and an initial downlink sub-BWP) may refer to a band to which the terminal apparatus 1 applies the RF circuit included in the terminal apparatus 1 itself. For example, in a case that the bandwidth of the initial downlink BWP is greater than the bandwidth of the RF circuit included in the terminal apparatus 1, the terminal apparatus 1 may determine the initial downlink sub-BWP of the bandwidth equal to or less than the bandwidth supported by the RF circuit of the terminal apparatus 1. For example, in a case that the bandwidth of the initial uplink BWP is greater than the bandwidth of the RF circuit included in the terminal apparatus 1, the terminal apparatus 1 may determine the initial uplink sub-BWP of the bandwidth equal to or less than the bandwidth supported by the RF circuit of the terminal apparatus 1.

The base station apparatus 3 may transmit a frequency-hopped downlink signal (which may be, for example, a PDSCH, a PDCCH, a PBCH, a synchronization signal, a Msg2 in a random access procedure, and/or a Msg4 in the random access procedure) by using at least two of multiple initial downlink sub-BWPs. However, the initial downlink sub-BWP is a frequency resource that can be used at least at the time of the initial access before the RRC connection is established. The terminal apparatus 1 may receive a frequency-hopped downlink signal by using at least two of the multiple initial downlink sub-BWPs. However, the multiple initial downlink sub-BWPs according to the present embodiment may be downlink BWPs to which the same identifier (BWP ID) is assigned. However, the multiple initial downlink sub-BWPs according to the present embodiment may be multiple downlink BWPs to which identifiers (BWP IDs) different from each other are assigned. The multiple initial downlink sub-BWPs may be multiple frequency bands including multiple sets of resource blocks configured by use of the SIB1. Each of the initial downlink sub-BWPs may include multiple resource blocks continuous in the frequency domain. For example, the multiple initial downlink sub-BWPs may be multiple downlink sub-BWPs configured in the initial downlink BWP having the BWP ID of 0 that is configured by use of the SIB1. For example, the respective downlink sub-BWPs may be assigned with different BWP IDs ((IDs: 0a, 0b, etc.) or sub-BWP IDs (ID: 0a, 0b, etc.). In this case, the configuration of the initial downlink BWP and the configuration of the multiple downlink sub-BWPs are configured by use of the SIB1.

Figure 11:
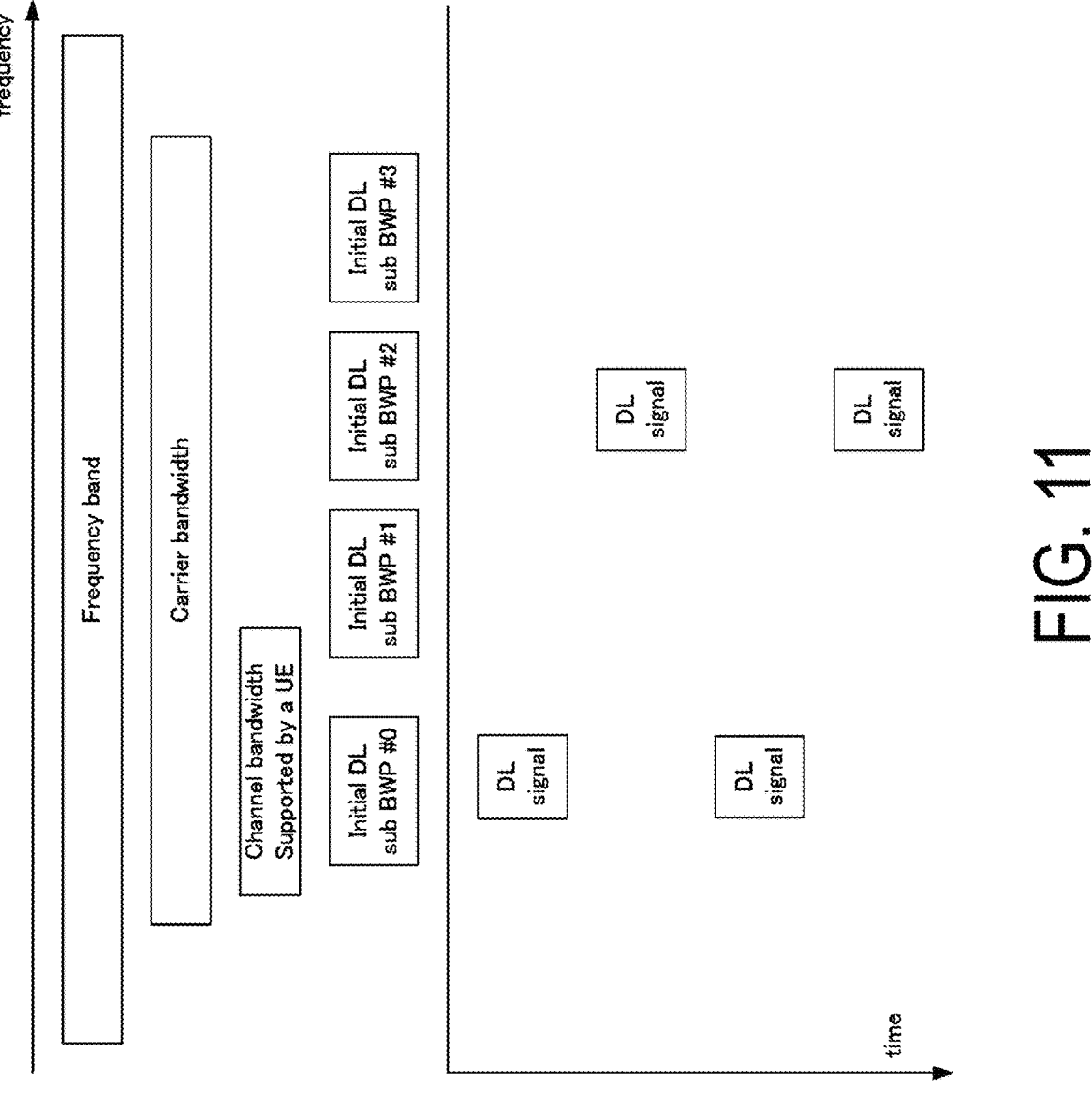
FIG. 11 is a diagram illustrating an example of downlink transmission using multiple initial downlink sub-BWPs according to an embodiment of the present invention.

FIG. 11 is a diagram illustrating an example of downlink transmission using multiple initial downlink sub-BWPs according to the present embodiment. FIG. 11 illustrates a case that four initial downlink sub-BWPs (initial DL sub-BWPs #0, #1, #2, and #3) are configured in a carrier existing in a frequency band. The terminal apparatus 1 supports a channel bandwidth wider than each of these four initial downlink sub-BWPs. In the example of FIG. 11, the terminal apparatus 1 repeatedly transmits one downlink signal while performing frequency hopping by using the initial downlink sub-BWP #0 and the initial downlink sub-BWP #2.

The base station apparatus 3 may transmit a downlink signal (which may be, for example, a PDSCH, a PDCCH, a PBCH, a synchronization signal, a Msg2 in a random access procedure, and/or a Msg4 in the random access procedure) by using one of the multiple initial downlink sub-BWPs. The terminal apparatus 1 may receive a downlink signal by using one of the multiple initial downlink sub-BWPs. The initial downlink sub-BWP may a frequency band including multiple sets of resource blocks configured by use of the SIB1.

The initial downlink sub-BWP may include multiple resource blocks continuous in the frequency domain. For example, the initial downlink sub-BWP may be one of multiple downlink sub-BWPs configured in the initial downlink BWP having the BWP ID of 0 that is configured by use of the SIB1. For example, the respective downlink sub-BWPs may be assigned with different BWP IDs ((IDs: 0a, 0b, etc.) or sub-BWP IDs (ID: 0, 1, etc.). In this case, the configuration of the initial downlink BWP and the configuration of the downlink sub-BWPs are configured by use of the SIB1.

The terminal apparatus 1 may transmit a frequency-hopped uplink signal (which may be, for example, a PUSCH, a PUCCH, a PRACH, and/or a Msg3 in a random access procedure) by using at least two of multiple initial uplink sub-BWPs. However, the initial uplink sub-BWP is a frequency resource that can be used at least at the time of the initial access before the RRC connection is established. The base station apparatus 3 may receive a frequency-hopped uplink signal by using at least two of the multiple initial uplink sub-BWPs. However, the multiple initial uplink sub-BWPs according to the present embodiment may be configured in frequency bands of the uplink BWPs to which the same identifier (BWP ID) is assigned. However, the multiple initial uplink BWPs according to the present embodiment may be multiple uplink BWPs to which identifiers (BWP IDs) different from each other are assigned. The multiple initial uplink sub-BWPs may be multiple frequency bands including multiple sets of resource blocks configured by use of the SIB1. Each of the initial uplink sub-BWPs may include multiple resource blocks continuous in the frequency domain. For example, the multiple initial uplink BWPs may be multiple uplink sub-BWPs configured in the initial uplink BWP having the BWP ID of 0 that is configured by use of the SIB1. For example, the respective uplink sub-BWPs may be assigned with different BWP IDs (IDs: 0a, 0b, etc.) or sub-BWP IDs (ID: 0, 1, etc.). In this case, the configuration of the initial uplink BWP and the configuration of the multiple uplink sub-BWPs are configured by use of the SIB1.

The terminal apparatus 1 may transmit a frequency-hopped uplink signal (which may be, for example, a PUSCH, a PUCCH, a PRACH, and/or a Msg3 in a random access procedure) by using one of the multiple initial uplink sub-BWPs. The base station apparatus 3 may receive a frequency-hopped uplink signal by using one of the multiple initial uplink sub-BWPs. The initial uplink sub-BWP may a frequency band including multiple sets of resource blocks configured by use of the SIB1. The initial uplink sub-BWP may include multiple resource blocks continuous in the frequency domain. For example, the multiple initial uplink BWPs may be multiple uplink sub-BWPs configured in the initial uplink BWP having the BWP ID of 0 that is configured by use of the SIB1. For example, the respective uplink sub-BWPs may be assigned with different BWP IDs ((IDs: 0a, 0b, etc.) or sub-BWP IDs (ID: 0, 1, etc.). In this case, the configuration of the initial uplink BWP and the configuration of the uplink sub-BWP are configured by use of the SIB1.

The terminal apparatus 1 may determine whether the cell is a barred cell based on whether or not the terminal apparatus 1 supports an uplink channel bandwidth that is equal to or narrower than the carrier bandwidth indicated by the SIB1. However, the terminal apparatus 1 supporting a bandwidth may mean that the terminal apparatus 1 can tune/retune the band of the RF circuit included in the terminal apparatus 1 within the bandwidth to transmit and/or receive a signal/channel within the bandwidth. For example, the uplink channel bandwidth supported by the terminal apparatus 1 may be an uplink channel bandwidth in which a signal/channel can be transmitted using RF tuning/RF retuning. For example, in a case that the terminal apparatus 1 does not support the uplink channel bandwidth that is equal to or narrower than the subcarrier bandwidth indicated by the received SIB1, the terminal apparatus 1 may consider the cell as a barred cell. However, the carrier bandwidth may be a carrier bandwidth corresponding to the subcarrier spacing of the initial uplink BWP configured in the received SIB1. However, the carrier bandwidth may be a carrier bandwidth corresponding to the subcarrier spacing common to multiple initial uplink sub-BWPs configured in the received SIB1.

The terminal apparatus 1 according to the present embodiment may receive information of the carrier bandwidth, information of the bandwidth of the initial uplink BWP, and information indicating the maximum allocation bandwidth (which may be information indicating the maximum allocation bandwidth of the uplink) in the SIB1 corresponding to a cell, and may determine whether the cell is a barred cell based on whether the terminal apparatus 1 supports the uplink channel bandwidth that is the maximum transmission bandwidth configuration of the bandwidth equal to or less than the carrier bandwidth and equal to or more than the bandwidth of the initial uplink BWP and whether the terminal apparatus 1 supports the uplink allocation bandwidth equal to or more than the maximum allocation bandwidth.

The terminal apparatus 1 may determine whether the cell is a barred cell based on whether or not the terminal apparatus 1 supports an uplink bandwidth that is equal to or narrower than the carrier bandwidth indicated by the SIB1. For example, in a case that the terminal apparatus 1 does not support the uplink bandwidth that is equal to or narrower than the subcarrier bandwidth indicated by the received SIB1, the terminal apparatus 1 may consider the cell as a barred cell. However, the carrier bandwidth may be a carrier bandwidth corresponding to the subcarrier spacing of the initial uplink BWP configured in the received SIB1. However, the carrier bandwidth may be a carrier bandwidth corresponding to the subcarrier spacing common to multiple initial uplink sub-BWPs configured in the received SIB1.

That is, the terminal apparatus 1 may determine whether a cell is a barred cell based on the bandwidth of the initial downlink BWP configured by use of the received SIB1 corresponding to the cell, the bandwidths of the multiple initial downlink sub-BWPs configured by use of the received SIB1 corresponding to the cell, the bandwidth of the initial uplink BWP configured by use of the received SIB1 corresponding to the cell, the bandwidths of the multiple initial uplink sub-BWPs configured by use of the received SIB1 corresponding to the cell, the carrier bandwidth configured by use of the received SIB1 corresponding to the cell, and/or the capability of the terminal apparatus 1.

However, the parameter configured in the SIB1 may be broadcasted using other SIBs (or REDCAP SIBs) or may be notified using an RRC message.

Configurations of apparatuses according to the present embodiment will be described below.

Figure 12:
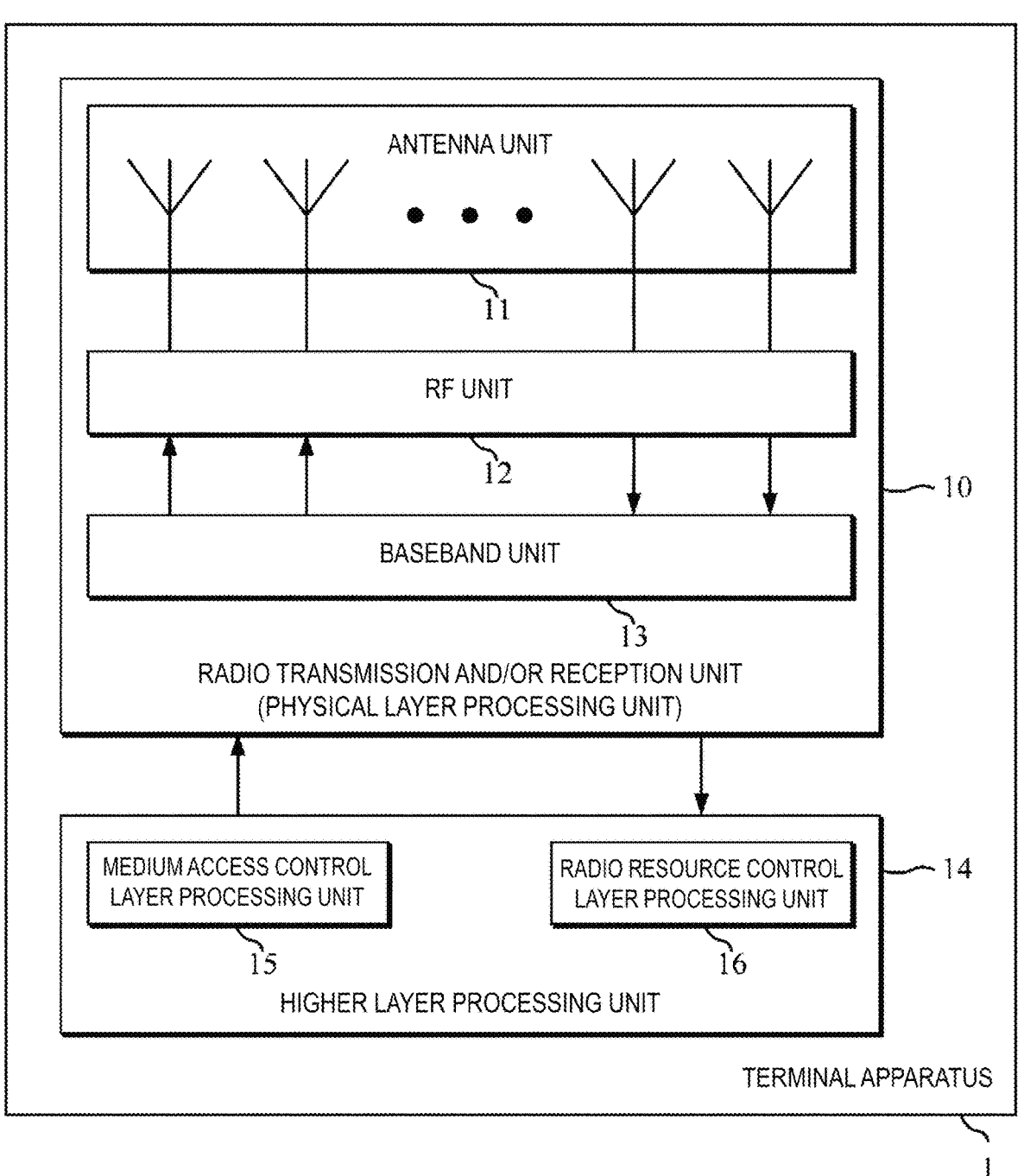
FIG. 12 is a schematic block diagram illustrating a configuration of the terminal apparatus 1 according to an embodiment of the present invention.

FIG. 12 is a schematic block diagram illustrating a configuration of the terminal apparatus 1 according to the present embodiment. As illustrated in the figure, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter 10, a receiver 10, a monitor unit 10, or a physical layer processing unit 10. The higher layer processing unit 14 is also referred to as a processing unit 14, a measurement unit 14, a selection unit, 14, a determination unit 14, or a controller 14.

The higher layer processing unit 14 outputs uplink data (that may be referred to as transport block) generated by a user operation or the like, to the radio transmission and/or reception unit 10. The higher layer processing unit 14 performs a part or all of the processing of the Medium Access Control (MAC) layer, the Packet Data Convergence Protocol (PDCP) layer, the Radio Link Control (RLC) layer, and the Radio Resource Control (RRC) layer. The higher layer processing unit 14 may have a function of acquiring bit information of the MIB (which may be the REDCAP MIB), the SIB1 (which may be the REDCAP SIB1), and other SIBs (which may be the REDCAP SIBs). The higher layer processing unit 14 may have a function of determining/specifying a configuration of an initial downlink BWP (for example, a frequency location or a bandwidth) based on information of the system information block (SIB1/SIB) and/or the RRC message. The higher layer processing unit 14 may have a function of determining/specifying a configuration of an initial uplink BWP (for example, a frequency location or a bandwidth) based on information of the system information block (SIB1/SIB) and/or the RRC message.

The medium access control layer processing unit 15 included in the higher layer processing unit 14 performs processing of the Medium Access Control layer (MAC layer). The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer (RRC layer). The radio resource control layer processing unit 16 performs management of various pieces of configuration information/parameters for its apparatus. The radio resource control layer processing unit 16 sets various pieces of configuration information/parameters, based on a higher layer signaling received from the base station apparatus 3. Specifically, the radio resource control layer processing unit 16 sets various pieces of configuration information/parameters, based on information indicating the various pieces of configuration information/parameters received from the base station apparatus 3. The radio resource control layer processing unit 16 controls (identifies) the resource allocation, based on the downlink control information received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and transmits the transmit signal to the base station apparatus 3 or the like. The radio transmission and/or reception unit 10 outputs, to the higher layer processing unit 14, the higher layer signaling (RRC message), DCI, and the like received from the base station apparatus 3. The radio transmission and/or reception unit 10 generates and transmits an uplink signal (including a PUCCH and/or a PUSCH), based on an indication from the higher layer processing unit 14. The radio transmission and/or reception unit 10 may have a function of receiving a random access response, the PDCCH, and/or the PDSCH. The radio transmission and/or reception unit 10 may have a function of transmitting a PRACH (which may be a random access preamble), the PUCCH, and/or the PUSCH. The radio transmission and/or reception unit 10 may have a function of monitoring the PDCCH. The radio transmission and/or reception unit 10 may have a function of receiving the DCI on the PDCCH. The radio transmission and/or reception unit 10 may have a function of outputting the DCI received on the PDCCH to the higher layer processing unit 14. The radio transmission and/or reception unit 10 may have a function of receiving the SSB, the PSS, the SSS, the PBCH, and/or the DMRS for the PBCH. The radio transmission and/or reception unit 10 may have a function of receiving the SS/PBCH block. The radio transmission and/or reception unit 10 may have a function of receiving the system information block (SIB1 and/or SIB) corresponding to a prescribed cell. The radio transmission and/or reception unit 10 may have a function of receiving information including information for determining/specifying the configuration of the initial downlink BWP (for example, a frequency location or a bandwidth). The radio transmission and/or reception unit 10 may have a function of receiving information including information for determining/specifying the configuration of the initial uplink BWP (for example, a frequency location or a bandwidth).

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 generates an OFDM symbol by performing Inverse Fast Fourier Transform (IFFT) on the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal having a carrier frequency, and transmits the signal via the antenna unit 11. The RF unit 12 amplifies power. Additionally, the RF unit 12 may have a function of determining transmit power for an uplink signal and/or an uplink channel transmitted in the serving cell. The RF unit 12 is also referred to as a transmit power control unit.

The RF unit 12 may use the antenna switch to connect the antenna unit 11 with the filter included in the RF unit 12 in a case of receiving a signal and to connect the antenna unit 11 with the power amplifier included in the RF unit 12 in a case of transmitting a signal.

The RF unit 12 may have a function of tuning/retuning the frequency band applied to the RF circuit in the configured downlink BWP (for example, the initial downlink BWP) in a case that the bandwidth of the configured downlink BWP is wider than the bandwidth supported by the receiver of the terminal apparatus 1 itself (which may be referred to as an allocation bandwidth). However, the frequency band applied to the RF circuit may be a frequency band of a carrier frequency applied in a case of a received signal is down-converted into a baseband signal.

The RF unit 12 may have a function of tuning/retuning the frequency band applied to the RF circuit in the configured uplink BWP (for example, the initial downlink BWP) in a case that the bandwidth of the configured uplink BWP is wider than the bandwidth supported by the transmission of the terminal apparatus 1 itself (which may be referred to as an allocation bandwidth). However, the frequency band applied to the RF circuit may be a frequency band of a carrier frequency applied in a case that an analog signal is up-converted to a carrier frequency.

Figure 13:
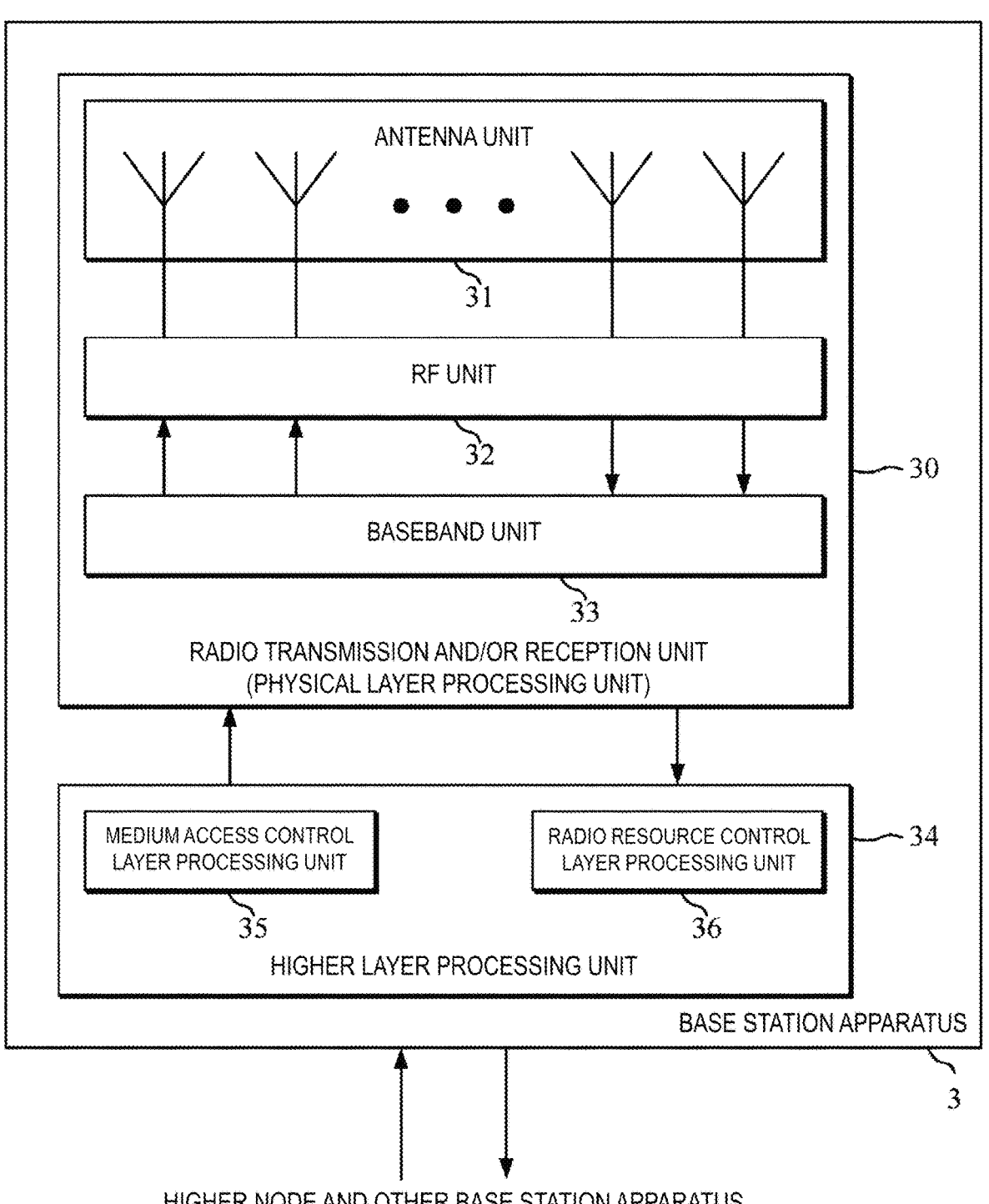
FIG. 13 is a schematic block diagram illustrating a configuration of a base station apparatus 3 according to an embodiment of the present invention.

FIG. 13 is a schematic block diagram illustrating a configuration of the base station apparatus 3 according to the present embodiment. As illustrated in the figure, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter 30, a receiver 30, a monitor unit 30, or a physical layer processing unit 30. A controller controlling operations of the units based on various conditions may be separately provided. The higher layer processing unit 34 is also referred to as a processing unit 34, a determination unit 34, or a controller 34.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 34 may have a function of generating DCI, based on the higher layer signaling transmitted to the terminal apparatus 1 and the time resources for transmitting the PUSCH. The higher layer processing unit 34 may have a function of outputting the generated DCI and the like to the radio transmission and/or reception unit 30. The higher layer processing unit 34 may have a function of generating a system information block (SIB1/SIB) and/or an RRC message including information for the terminal apparatus 1 to specify the initial downlink BWP. The higher layer processing unit 34 may have a function of generating a system information block (SIB1/SIB) and/or an RRC message including information for the terminal apparatus 1 to specify the initial uplink BWP.

The medium access control layer processing unit 35 included in the higher layer processing unit 34 performs processing of the MAC layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the RRC layer. The radio resource control layer processing unit 36 generates, for the terminal apparatus 1. DCI (uplink grant and downlink grant) including resource allocation information. The radio resource control layer processing unit 36 generates or acquires from a higher node, DCI, downlink data (transport block (TB) and random access response (RAR)) mapped to a PDSCH, system information, an RRC message, a MAC Control Element (CE), and the like, and outputs the generated or acquired data and the like to the radio transmission and/or reception unit 30. The radio resource control layer processing unit 36 performs management of various pieces of configuration information/parameters for each of the terminal apparatuses 1. The radio resource control layer processing unit 36 may set various pieces of configuration information/parameters for each of the terminal apparatuses 1 through a higher layer signaling. Specifically, the radio resource control layer processing unit 36 transmits or broadcasts information indicating the various pieces of configuration information/parameters. The radio resource control layer processing unit 36 may transmit/report information for identifying a configuration of one or multiple reference signals in a cell.

In a case that the base station apparatus 3 transmits the RRC message, the MAC CE, and/or the PDCCH to the terminal apparatus 1, and the terminal apparatus 1 performs processing, based on the reception, the base station apparatus 3 performs processing (control of the terminal apparatus 1 and the system) assuming that the terminal apparatus is performing the above-described processing. In other words, the base station apparatus 3 sends, to the terminal apparatus 1, the RRC message, MAC CE, and/or PDCCH intended to cause the terminal apparatus to perform the processing based on the reception.

The radio transmission and/or reception unit 30 transmits higher layer signaling (RRC message), DCI, and the like to the terminal apparatus 1. The radio transmission and/or reception unit 30 receives the uplink signal transmitted from the terminal apparatus 1 based on an indication from the higher layer processing unit 34. The radio transmission and/or reception unit 30 may have a function of transmitting the PDCCH and/or the PDSCH. The radio transmission and/or reception unit 30 may have a function of receiving one or more PUCCHs and/or PUSCHs. The radio transmission and/or reception unit 30 may have a function of transmitting the DCI on the PDCCH. The radio transmission and/or reception unit 30 may have a function of transmitting the DCI output by the higher layer processing unit 34, on the PDCCH. The radio transmission and/or reception unit 30 may have a function of transmitting the SSB, the PSS, the SSS, the PBCH, and/or the DMRS for the PBCH. The radio transmission and/or reception unit 30 may have a function of transmitting the SS/PBCH block. The radio transmission and/or reception unit 30 may have a function of transmitting an RRC message (which may be an RRC parameter). The radio transmission and/or reception unit 30 may have a function of transmitting the system information block (SIB1/SIB) by the terminal apparatus 1. In addition, some of the functions of the radio transmission and/or reception unit 30 are similar to the corresponding functions of the radio transmission and/or reception unit 10, and thus description of these functions is omitted. Note that in a case that the base station apparatus 3 is connected to one or multiple transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in FIG. 13, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an application layer processing unit reside in the higher layer processing unit 34.

Note that "units" in the drawing refer to constituent elements to realize the functions and the procedures of the terminal apparatus 1 and the base station apparatus 3, which are also represented by the terms such as a section, a circuit, a constituting apparatus, a device, a unit, and the like.

Each of the units denoted by the reference sign 10 to the reference sign 16 included in the terminal apparatus 1 may be configured as a circuit. Each of the units denoted by the reference sign 30 to the reference sign 36 included in the base station apparatus 3 may be configured as a circuit.

(1) A terminal apparatus 1 according to a first aspect of the present invention includes a receiver 10 configured to receive first information (initialDownlinkBWP), and a monitor unit 10 configured to monitor a physical downlink control channel (PDCCH) in an initial downlink BWP, wherein the first information indicates common parameters for an initial downlink BWP of a cell, and includes second information (genericParameters) indicating generic parameters for the initial downlink BWP and third information (pdech-ConfigCommon) indicating cell common parameters for the physical downlink control channel in the initial downlink BWP, the second information includes fourth information (locationAndBandwidth) indicating a first frequency location and bandwidth of the initial downlink BWP and fifth information (subcarrierSpacing) indicating a subcarrier spacing of a channel used in the initial downlink BWP, a frequency location and bandwidth of the initial downlink BWP is indicated in sixth information in a case that the first information includes the sixth information (locationAndBandwidth-rc) indicating a second frequency location and bandwidth of the initial downlink BWP, the frequency location and bandwidth of the initial downlink BWP is indicated in the fourth information in a case that the first information does not include the sixth information, and the monitor unit 10 monitors the physical downlink control channel based on the third information regardless of whether or not the first information includes the sixth information.

(2) In the first aspect of the present invention, the physical downlink control channel may be monitored based on the fifth information regardless of whether or not the first information includes the sixth information.

(3) In the first aspect of the present invention, the sixth information may be information that is not included in the second information.

(4) In the first aspect of the present invention, the third information may include information for specifying a search space for monitoring the physical downlink control channel and information for specifying a control resource set for monitoring the physical downlink control channel.

(5) A base station apparatus 3 according to a second aspect of the present invention includes a broadcast unit 30 configured to broadcast first information (initialDownlinkBWP), and a transmitter 30 configured to transmit a first physical downlink control channel (PDCCH) to a first terminal apparatus and transmit a second physical downlink control channel to a second terminal apparatus, wherein the first information indicates common parameters for an initial downlink BWP of a cell, and includes second information (genericParameters) indicating generic parameters for the initial downlink BWP and third information (pdech-Config-Common) indicating cell common parameters for a physical downlink control channel in the initial downlink BWP, the second information includes fourth information (location AndBandwidth) indicating a first frequency location and bandwidth of the initial downlink BWP and fifth information (subcarrierSpacing) indicating a subcarrier spacing of a channel used in the initial downlink BWP, the first information includes sixth information (locationAndBandwidth-rc) indicating a second frequency location and bandwidth of the initial downlink BWP, a frequency location and bandwidth of the initial downlink BWP for the first terminal apparatus is indicated in the sixth information, a frequency location and bandwidth of the initial downlink BWP for the second terminal apparatus is indicated in the fourth information, and the transmitter 30 transmits the first physical downlink control channel and the second physical downlink control channel based on the third information.

(6) In the second aspect of the present invention, the physical downlink control channel may be transmitted based on the fifth information regardless of whether or not the first information includes the sixth information.

(7) In the second aspect of the present invention, the sixth information may be information that is not included in the second information.

(8) In the second aspect of the present invention, the third information may include information for specifying a search space for the first terminal apparatus and the second terminal apparatus to monitor the physical downlink control channel, and information for specifying a control resource set for the first terminal apparatus and the second terminal apparatus to monitor the physical downlink control channel.

(9) A terminal apparatus 1 according to a third aspect of the present invention includes a receiver 10 configured to receive first information (initialUplinkBWP), and a transmitter 10 configured to transmit a physical uplink shared channel (PUSCH) in an initial uplink BWP, wherein the first information indicates common parameters for an initial uplink BWP of a cell, and includes second information (genericParameters) indicating generic parameters for the initial uplink BWP and third information (pusch-Config-Common) indicating cell common parameters for the physical uplink shared channel in the initial uplink BWP, the second information includes fourth information (locationAndBandwidth) indicating a first frequency location and bandwidth of the initial uplink BWP and fifth information (subcarrierSpacing) indicating a subcarrier spacing of a channel used in the initial uplink BWP, a frequency location and bandwidth of the initial uplink BWP is indicated in sixth information in a case that the first information includes the sixth information (location AndBandwidth-rc) indicating a second frequency location and bandwidth of the initial uplink BWP, the frequency location and bandwidth of the initial uplink BWP is indicated in the fourth information in a case that the first information does not include the sixth information, and the transmitter 10 transmits the physical uplink shared channel based on the third information regardless of whether or not the first information includes the sixth information.

(10) In the third aspect of the present invention, the physical uplink shared channel may be transmitted based on the fifth information regardless of whether or not the first information includes the sixth information.

(11) In the third aspect of the present invention, the sixth information may be information that is not included in the second information.

(12) In the third aspect of the present invention, the third information may include information for specifying a list of time domain allocations for timing of transmitting the physical uplink shared channel.

(13) A base station apparatus 3 according to a fourth aspect of the present invention includes a broadcast unit 30 configured to broadcast first information (initialUplinkBWP), and a receiver 30 configured to receive a first physical uplink shared channel (PUSCH) from a first terminal apparatus and receive a second physical uplink shared channel from a second terminal apparatus, wherein the first information indicates common parameters for an initial uplink BWP of a cell, and includes second information (genericParameters) indicating generic parameters for the initial uplink BWP and third information (pusch-Config-Common) indicating cell common parameters for a physical uplink shared channel in the initial uplink BWP, the second information includes fourth information (locationAndBandwidth) indicating a first frequency location and bandwidth of the initial uplink BWP and fifth information (subcarrierSpacing) indicating a subcarrier spacing of a channel used in the initial uplink BWP, the first information includes sixth information (locationAndBandwidth-rc) indicating a second frequency location and bandwidth of the initial uplink BWP, a frequency location and bandwidth of the initial uplink BWP for the first terminal apparatus is indicated in the sixth information, a frequency location and bandwidth of the initial uplink BWP for the second terminal apparatus is indicated in the fourth information, and the transmitter 30 transmits the first physical uplink shared channel and the second physical uplink shared channel based on the third information.

(14) In the fourth aspect of the present invention, the physical uplink shared channel may be transmitted based on the fifth information regardless of whether or not the first information includes the sixth information.

(15) In the fourth aspect of the present invention, the sixth information may be information that is not included in the second information.

(16) In the fourth aspect of the present invention, the third information may include information for specifying a list of time domain allocations for timing of transmitting the physical uplink shared channel.

This allows the terminal apparatus 1 and the base station apparatus 3 to efficiently communicate with each other.

A program running on an apparatus according to an aspect of the present invention may serve as a program that controls a Central Processing Unit (CPU) and the like to cause a computer to function in such a manner as to realize the functions of the embodiment according to the aspect of the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. It may be implemented by causing a computer system to read and execute the program recorded on this recording medium. It is assumed that the "computer system" refers to a computer system built into the apparatuses, and the computer system includes an operating system and hardware components such as a peripheral device. The "computer-readable recording medium" may be a semiconductor recording medium, an optical recording medium, a magnetic recording medium, a medium dynamically retaining the program for a short time, or any other computer-readable recording medium.

Each functional block or various features of the apparatuses used in the aforementioned embodiment may be imple-mented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general purpose processor may be a microprocessor or may be a processor, a controller, a micro-controller, or a state machine of known type, instead. The aforementioned electric circuit may include a digital circuit or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that, in the embodiments according to an aspect of the present invention, an example has been described in which the present invention is applied to a communication system including a base station apparatus and a terminal apparatus, but the present invention can also be applied in a system in which terminals communicate as in the case of Device to Device (D2D).

Note that, the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. A configuration in which elements described in the respective embodiments and having mutually the similar effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B) Terminal apparatus
3 Base station apparatus
4 Transmission reception point (TRP)
10 Radio transmission and/or reception unit
11 Antenna unit
12 RF unit

13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit
50 Transmission unit (TXRU)
51 Phase shifter
52 Antenna element

The invention claimed is:

1. A terminal apparatus comprising:

a receiver configured to receive System Information Block 1 (SIB1); and monitor circuitry configured to monitor physical downlink control channel based on first information included in the SIB1, wherein, the SIB1 includes second information indicating a first frequency location and first bandwidth of initial downlink band width part (BWP), in a case that the SIB1 includes third information indicating a second frequency location and second bandwidth of the initial downlink BWP, a frequency location and bandwidth of the initial downlink BWP is indicated by the third information, in a case that the SIB1 does not include the third information, the frequency location and the bandwidth of the initial downlink BWP is indicated by the second information, and the monitor circuitry is configured to monitor the physical downlink control channel based on the first information, regardless of whether the SIB1 includes the third information.

2. A base station apparatus comprising:

higher layer processing circuitry configured to generate System Information Block 1 (SIB1); and a transmitter configured to transmit the SIB1, and to transmit physical downlink control channel based on first information included in the SIB1, wherein, the SIB1 includes second information indicating a first frequency location and first bandwidth of initial downlink band width part (BWP), in a case that the SIB1 includes third information indicating a second frequency location and second bandwidth of the initial downlink BWP, a frequency location and bandwidth of the initial downlink BWP is indicated by the third information, in a case that the SIB1 does not include the third information, the frequency location and the bandwidth of the initial downlink BWP is indicated by the second information, and the transmitter is configured to transmit the physical downlink control channel based on the first information, regardless of whether the SIB1 includes the third information.

3. A communication method for a terminal apparatus comprising:

receiving System Information Block 1 (SIB1); and monitoring physical downlink control channel based on first information included in the SIB1, wherein, the SIB1 includes second information indicating a first frequency location and first bandwidth of initial downlink band width part (BWP), in a case that the SIB1 includes third information indicating a second frequency location and second bandwidth of the initial downlink BWP, a frequency location and bandwidth of the initial downlink BWP is indicated by the third information, in a case that the SIB1 does not include the third information, the frequency location and the bandwidth of the initial downlink BWP is indicated by the second information, and the monitoring the physical downlink control channel is based on the first information, regardless of whether the SIB1 includes the third information.

* * * * *